USO08453077B2

(12) United States Patent
Makino et al.

(10) Patent No.: US 8,453,077 B2
(45) Date of Patent: May 28, 2013

(54) CIRCUIT DESIGNING METHOD AND CIRCUIT DESIGNING SYSTEM

(75) Inventors: Sumiko Makino, Kawasaki (JP); Yasuo Amano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/550,940

(22) Filed: Jul. 17, 2012

(65) Prior Publication Data

US 2012/0284681 A1 Nov. 8, 2012

Related U.S. Application Data

(63) Continuation of application No. PCT/JP2010/051532, filed on Feb. 3, 2010.

(51) Int. Cl.
*G06F 17/50* (2006.01)
(52) U.S. Cl.
USPC ........... 716/100; 716/106; 716/108; 716/111; 716/113
(58) Field of Classification Search
USPC .................................................. 716/100–113
See application file for complete search history.

(56) References Cited

U.S. PATENT DOCUMENTS

| 5,856,925 | A | 1/1999 | Maeda et al. | |
|---|---|---|---|---|
| 2002/0083398 | A1 | 6/2002 | Takeyama et al. | |
| 2006/0218512 | A1* | 9/2006 | Arslan et al. | 716/4 |
| 2011/0054875 | A1* | 3/2011 | Chang et al. | 703/14 |

FOREIGN PATENT DOCUMENTS

| JP | 5-181929 | 7/1993 |
|---|---|---|
| JP | 6-52248 | 2/1994 |
| JP | 7-93395 | 4/1995 |
| JP | 2001-267429 | 9/2001 |
| JP | 2002-149730 | 5/2002 |
| JP | 2002-313918 | 10/2002 |

OTHER PUBLICATIONS

International Search Report of PCT/JP2010/051532 mailed Mar. 9, 2010.

* cited by examiner

*Primary Examiner* — Paul Dinh
(74) *Attorney, Agent, or Firm* — Staas & Halsey LLP

(57) ABSTRACT

A circuit designing method designs a circuit by client computers designing blocks forming the circuit in parallel, and a server exchanging information in real-time with each client computer. The method may notify information related to blocks corresponding to a request from each client computer to the server, analyze each block by an analyzing tool based on the acquired information, and when an analysis result includes an error, compute by a modification ease computing tool, a modification ease of an arbitrary block that includes the error, to notify each client computer of an analysis result taking into consideration the modification ease.

15 Claims, 25 Drawing Sheets

CIRCUIT DESIGNING METHOD AND CIRCUIT DESIGNING SYSTEM

CROSS-REFERENCE TO RELATED APPLICATION

This application is a continuation application of International Application No. PCT/JP2010/051532 filed on Feb. 3, 2010 and designated the U.S., the entire contents of which are incorporated herein by reference.

FIELD

The embodiments discussed herein are related to a circuit designing method, a circuit designing system. The circuit designing method and the circuit designing system may be suited for designing a large scale integrated circuit, such as a CPU (Central Processing Unit), a SoC (System-on-a-Chip), and the like, by CAD (Computer Aided Design). The embodiments discussed herein may also be related to a computer-readable storage medium having stored therein a program for causing a computer to execute a circuit design management process.

BACKGROUND

A technique called hierarchical design may be used to design a large scale integrated circuit, such as a CPU, a SoC, and the like. According to the hierarchical design technique, the entire circuit that is a design target may be segmented into a plurality of regions called blocks, and one or a plurality of designers may design each of the blocks. At a stage when the design operation with respect to all of the blocks is completed, the blocks may be merged and the circuit may be assembled as a chip. Then, various analysis including inspections, tests, evaluations, and the like may be performed with respect to the entire chip. The design operations with respect to all of the blocks may be performed in parallel according to the hierarchical design technique, however, a highly accurate check, test, evaluation, and the like may be difficult to perform until the circuits are assembled into the chip. The design may be performed by securing a region in which route (or wiring) is prohibited, that is, a route prohibited region, at a boundary between mutually adjacent blocks, in order to avoid a spacing error and the like between the mutually adjacent blocks.

When an inclusion relationship exists among the plurality of blocks designed by the hierarchical design technique, there is a proposed method that makes reference to timing distributing design information (for example, Japanese Laid-Open Patent Publication No. 2002-149730). However, according to this proposed method, it may be difficult, during the design operation of the blocks, to reflect information of blocks in other hierarchical levels that are not in the inclusion relationship to the design of the blocks.

Hence, the following problems may occur in the conventional circuit designing method using the hierarchical design technique.

First, according to the conventional circuit designing method using the hierarchical design technique, the CAD may automatically secure the route prohibited region between the blocks in order to avoid redesigning caused by the spacing error, crosstalk noise error, and the like when merging the blocks. For this reason, the number of routes that may be used may decrease. In addition, because the route prohibited region is provided with a margin that may avoid the error even when the adjacent block or the route is arranged at a closest location, the utilization efficiency of available space may be poor.

Second, according to the conventional circuit designing method using the hierarchical design technique, a highly accurate analysis may be difficult to perform unless after the blocks are merged. Consequently, the redesigning may be required, and reflecting the redesigning to the analysis may be required. As a result, it may take a relatively long time for the design to converge. For example, the design operation may include creating an internal layout of each of the blocks forming the circuit that is the design target, merging all of the blocks and assembling the circuit as a chip, and analyzing the assembled circuit by performing a timing check or the like. When a timing adjustment or the like is preferred as a result of the analysis, the redesigning may again be required to perform the design operation from the start, namely, creating the internal layout of each of the blocks.

Therefore, according to the conventional circuit designing method using the hierarchical design technique, the degree of freedom of the routes between blocks forming the circuit that is the design target may be relatively small, and it may take a relatively long time for the design to converge.

The applicants are aware of Japanese Laid-Open Patent Publications No. 5-181929 and No. 6-52248.

SUMMARY

Accordingly, it is an object in one aspect of the embodiment to provide a circuit designing method, a circuit designing system, and a non-transitory computer-readable storage medium, that may improve the degree of freedom of routes between blocks forming a circuit that is a design target, or may converge the design in a relatively short time.

According to one aspect of the present invention, a circuit designing method to design a design target circuit by a plurality of client computers configured to design a plurality of blocks forming the design target circuit in parallel, and a server configured to exchange information in real-time with each of the plurality of client computers, may include notifying, in response to a request from the server, information related to blocks corresponding to the request, from each of the plurality of client computers to the server; analyzing each of the blocks by an analyzing tool within the server, based on the information acquired from each of the plurality of client computers, and obtaining an analysis result; and when the analysis result includes an error, computing, by a modification ease computing tool within the server, a design modification ease of an arbitrary block that includes the error for suppressing the error, and notifying an analysis result that takes the design modification ease into consideration to each of the client computers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be described with reference to the accompanying drawings.

According to the disclosed circuit designing method, circuit designing system, and computer-readable storage medium, the design may be performed while making a real-time communication to a server on states of blocks being designed in parallel on a plurality of client computers by a plurality of designers. Information of a certain block affecting another block may be automatically extracted. In addition, when information affecting another block is modified, a reference may be made in real-time to the modified information.

Hence, unwanted place and route prohibited regions within each of hierarchical levels may be omitted, and analyzing operations may be performed in parallel in each of the hierarchical levels at a stage when the design operation of all of the blocks is not completed.

A description will now be given of the circuit designing method, the circuit designing system, and the computer-readable storage medium in each embodiment according to the present invention.

Figure 1:
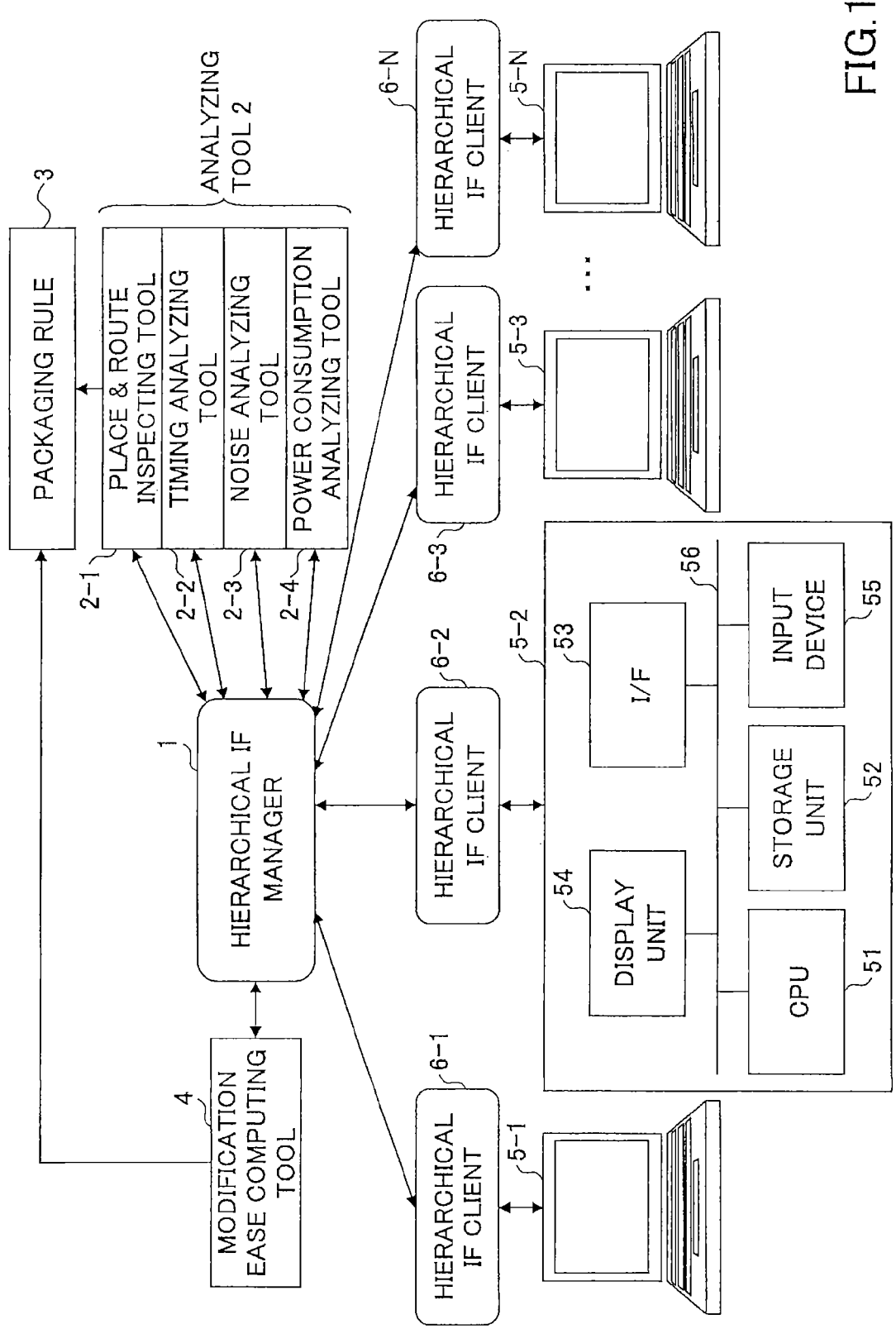
FIG. 1 is a diagram illustrating a circuit designing system in an embodiment of the present invention.

FIG. 1 is a diagram illustrating a circuit designing system in an embodiment of the present invention. The circuit designing system may include a hierarchical level interface (IF) manager 1, an analyzing tool 2, a modification ease computing tool 4, and a hierarchical level interface (IF) clients 6-1 through 6-N that are connected as illustrated in FIG. 1, where N is a natural number greater than or equal to 2. The hierarchical level IF clients (hereinafter referred to as "hierarchical IF clients") 6-1 through 6-N may be formed by corresponding general-purpose computers (or client computers) 5-1 through 5-N. In FIG. 1 and FIGS. 3, 8, 13, 18, and 23 which will be described later, the hierarchical IF clients 6-1 through 6-N and the computers 5-1 through 5-N are illustrated as if the corresponding hierarchical IF client 6-$j$ and computer 5-$j$ ($j=1, \ldots, N$) are connected, in order to facilitate the understanding of the relationship between processes executed in the hierarchical IF clients 6-1 through 6-N and other processes executed in the computers 5-1 through 5-N. However, the computers 5-1 through 5-N actually execute the processes of the corresponding hierarchical IF clients 6-1 through 6-N.

Each of the computers 5-1 through 5-N may have the same structure. As an example, FIG. 1 illustrates only the structure of the computer 5-2. The computer 5-2 may have a known structure including a CPU (Central Processing Unit) 51, a storage unit 52 formed by a semiconductor memory device, a disk drive, or the like, an interface (I/F) 53, a display unit 54, and an input device 55, such as a keyboard or the like, that are connected via a bus 56. The hierarchical IF clients 6-1 through 6-N may be formed by the computers 5-1 through 5-N, by storing a circuit designing program in the storage unit 52 of the computers 5-1 through 5-N and executing the circuit designing program. The circuit designing program may be stored in a non-transitory computer-readable storage medium, such as a disk, a memory, and the like. The computer-readable storage medium may be loaded into the computers 5-1 through 5-N as the storage unit 52, or the circuit designing program stored in the computer-readable storage medium may be read and installed into the storage unit 52. According to the hierarchical design technique, the entire circuit that is the design target is segmented into a plurality of region called blocks, and one or a plurality of designers design each of the blocks. Hence, each of the computers 5-1 through 5-N (that is, each of the hierarchical IF clients 6-1 through 6-N) may design at least one block by CAD.

The hierarchical level IF manager (hereinafter referred to as "hierarchical IF manager") 1 may be formed by a general-purpose computer (or server or server computer) having a structure similar to those of the computers 5-1 through 5-N, for example. In this case, at least the hierarchical IF manager 1, the analyzing tool 2, and the modification ease computing tool 4 may be formed by the general-purpose computer by storing a circuit design management program in the storage unit of the general-purpose computer and executing the circuit design management program. The circuit design management program may be stored in a non-transitory computer-readable storage medium, such as a disk, a memory, and the like. The computer-readable storage medium may be loaded into the general-purpose computer as the storage unit, or the circuit design management program stored in the computer-readable storage medium may be read and installed into the storage unit. A packaging rule 3 may be stored in the storage unit of the general-purpose computer, or may be stored in a storage unit that is externally connected to the general-purpose computer.

The hierarchical IF manager 1 exchanges information with each of the hierarchical IF clients 6-1 through 6-N. The hierarchical IF manager 1 gathers information related to the blocks forming the circuit that is the design target (hereinafter referred to as "analyzing target circuit"), acquired from the hierarchical IF clients 6-1 through 6-N, and notifies the gathered information to each of tools 2-1 through 2-4 of the analyzing tool 2. In addition, the hierarchical IF manager 1 transfers analysis results of the analyzing tool 2 to the modification ease computing tool 4, in order to notify the analysis results that take into consideration the modification ease of the design of the analyzing target circuit to the hierarchical IF clients 6-1 through 6-N. The hierarchical IF manger 1 may add or assign a priority order to each of the blocks forming the analyzing target circuit, when exchanging the information with the hierarchical IF clients 6-1 through 6-N, and when judging the modification ease of the design of the analyzing target circuit using the modification ease computing tool 4.

Each of the hierarchical IF clients 6-1 through 6-N may notify the information of each of the blocks to the hierarchical IF manager 1, according to a request from the hierarchical IF manager 1. In addition, each of the hierarchical IF clients 6-1 through 6-N may notify the information acquired from the hierarchical IF manager 1 to a processing module for each of the blocks, formed by the CPU 51.

The packaging rule 3 may include routing (or wiring) rule information of the design target circuit. The routing rule information includes at least one information selected from information related to a spacing value of place and route, information related to a driving performance, information related to an input load, information related to a wiring capacitance, and the like.

The analyzing tool 2 may analyze packaging data related to each of the blocks. The analyzing tool 2 may include a place and route (or layout and wiring) inspecting tool 2-1 to inspect the place and route according to contents to be analyzed, a timing analyzing tool 2-2 to analyze timings of various signals such as clock signals, a noise analyzing tool 2-2 to analyze noise, and a power consumption analyzing tool 2-4 to analyze a power consumption.

When the analyzing tool 2 detects an error, the modification ease computing tool 4 may compute a modification ease of the design for suppressing the error detected in a hierarchical level (that is, block), based on an arbitrary computation formula. The modification ease of the design computed in the modification ease computing tool 4 may be notified to the hierarchical IF manager 1.

When making a reference to route information of each hierarchical level (that is, each block), the route (for example, clock net, etc.) may be specified according to a default route type that is preset, or the route may be specified by the user from the input device 55.

The modification ease computing tool 4 may add a level indicating the modification ease of the design, that is, an extent to which the modification may be made, with respect to the present packaging data. The hierarchical IF manager 1 may notify error information to the processing module in the hierarchical level (that is, block) having a relatively high level. The modification ease computing tool 4 may add the level based on at least one information selected from information related to the modification ease for route modification, information related to the modification ease for signal timing correction, information related to the modification ease for noise analysis correction, information related to the modification ease for power consumption correction, and the like. A computation formula used by the modification ease computing tool 4 to compute the modification ease may be suitably selected according to whether the modification ease for the route modification, the modification ease for the signal timing correction, the modification ease for the noise analysis correction, or the modification ease for the power consumption correction is to be computed.

The modification ease for the route modification may include at least one of route (or wiring) information and route (or wiring) congestion. The route information may include information related to a wiring layer (or wiring level), wiring length, wiring coordinates, and the like. The route congestion may include information related to neighboring wirings, congestion rate of wirings, and the like.

The modification ease for the signal timing correction may include at least one of information related to a driving performance of a transistor gate that is used, and information indicating an extent to which the signal timing may be shortened or extended. The information related to the driving performance of the transistor gate may indicate whether the driving performance of the transistor gate may be increased or decreased. The information indicating the extent to which the signal timing may be shortened or extended may take into consideration information such as the input load, wiring capacitance, wiring length, wiring width, distance between terminals, route congestion, and the like.

The modification ease for the noise analysis correction may include at least one of the route information and the route congestion. The route information may include information related to the wiring layer, wiring width, wiring coordinates, and the like. The route congestion may include information related to the neighboring wirings, route congestion, and the like.

The modification ease for the power consumption correction may include at least one of information related to a threshold voltage of a macro (circuit part having a specific function) to be used, information related to a driving performance of a transistor gate to be used, and information indicating whether the signal timing modification is possible. The threshold voltage of the macro to be used may indicate whether the threshold voltage may be decreased. The driving performance of the transistor gate to be used may indicate whether the driving performance may be decreased.

When judging the modification ease, the hierarchical IF manager 1 may judge the modification ease of the circuit design according to the priority order, with respect to the packaging data (that is, blocks) for which the computation results obtained the modification ease computing tool 4 are the same, in order to judge that the higher the priority order the more unlikely the design modification may be required. The priority order may include a net priority order, and a hierarchical (or block) priority order. The net priority order may specify the priority order of the route (for example, clock net, etc.), according to a preset route type. The hierarchical priority order may specify the priority order according to a type of circuit part. The hierarchical priority order may specify the priority order of the hierarchical level in advance, so that the priority order is high when the packaging data of the block is related to the CPU, and is low when the packaging data of the block is related to the interface part, for example.

In this embodiment, the hierarchical IF manager 1 may perform the analysis using the packaging data on the boundary between the blocks, and for this reason, each of the blocks may be routed without requiring a place and route prohibited region. The processing module of each block may perform various analysis by communicating with the hierarchical IF manager 1. Hence, the operations with respect to each of the blocks may be performed in parallel, and highly accurate analysis results may be obtained without merging the blocks. In addition, the modification ease computing tool 4 may compute the modification ease from the analysis results of the analyzing tool 2, and the hierarchical IF manager 1 may judge from the computed modification ease that an error is generated at a part where the modification ease is relatively high, and notify the hierarchical level in which a design modification may be preferred.

Accordingly, the packaging data from each of the hierarchical IF clients 6-1 through 6-N may be reflected to the hierarchical IF manager 1 in real-time, and the hierarchical IF manager 1 may recognize the design modification without having to wait for the packaging data of other hierarchical levels to become definite, to thereby improve the operation efficiency or work efficiency. In addition, by performing the real-time communication between the hierarchical IF manager 1 and each of the hierarchical IF clients 6-1 through 6-N, the design modification in one hierarchical IF client may be notified to another hierarchical IF client, and the redesigning may be suppressed. Consequently, the circuit design time may be shortened. Furthermore, because the place and route prohibiting region to prohibit the place and route may be omitted in a neighborhood between the hierarchical levels (that is, between the blocks), the degree of freedom of the place and route between the blocks may be improved, and the congestion and the like of the place and route may be reduced.

Figure 2:
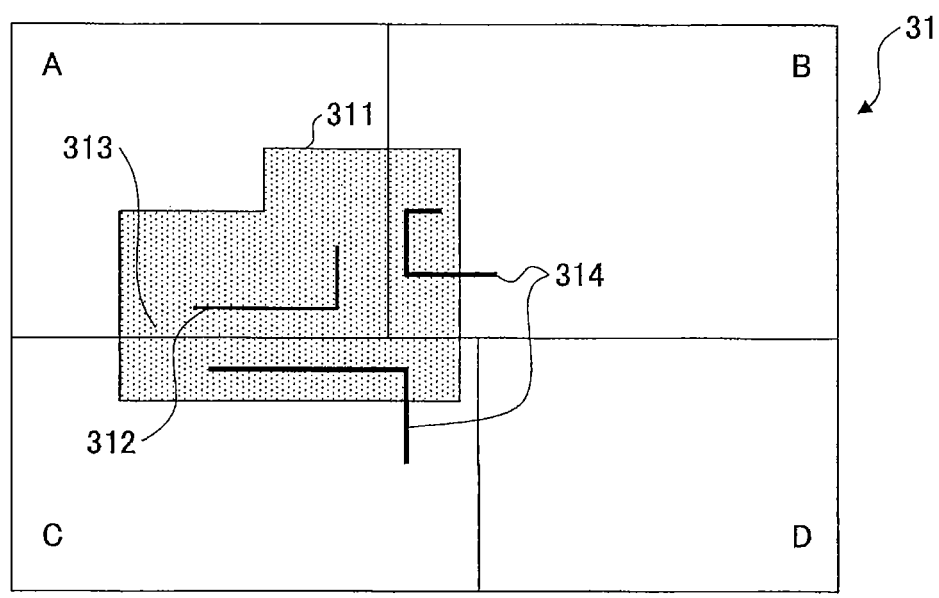
FIG. 2 is a diagram illustrating blocks for explaining a process to display boundary information between blocks affecting a route.
Figure 3:
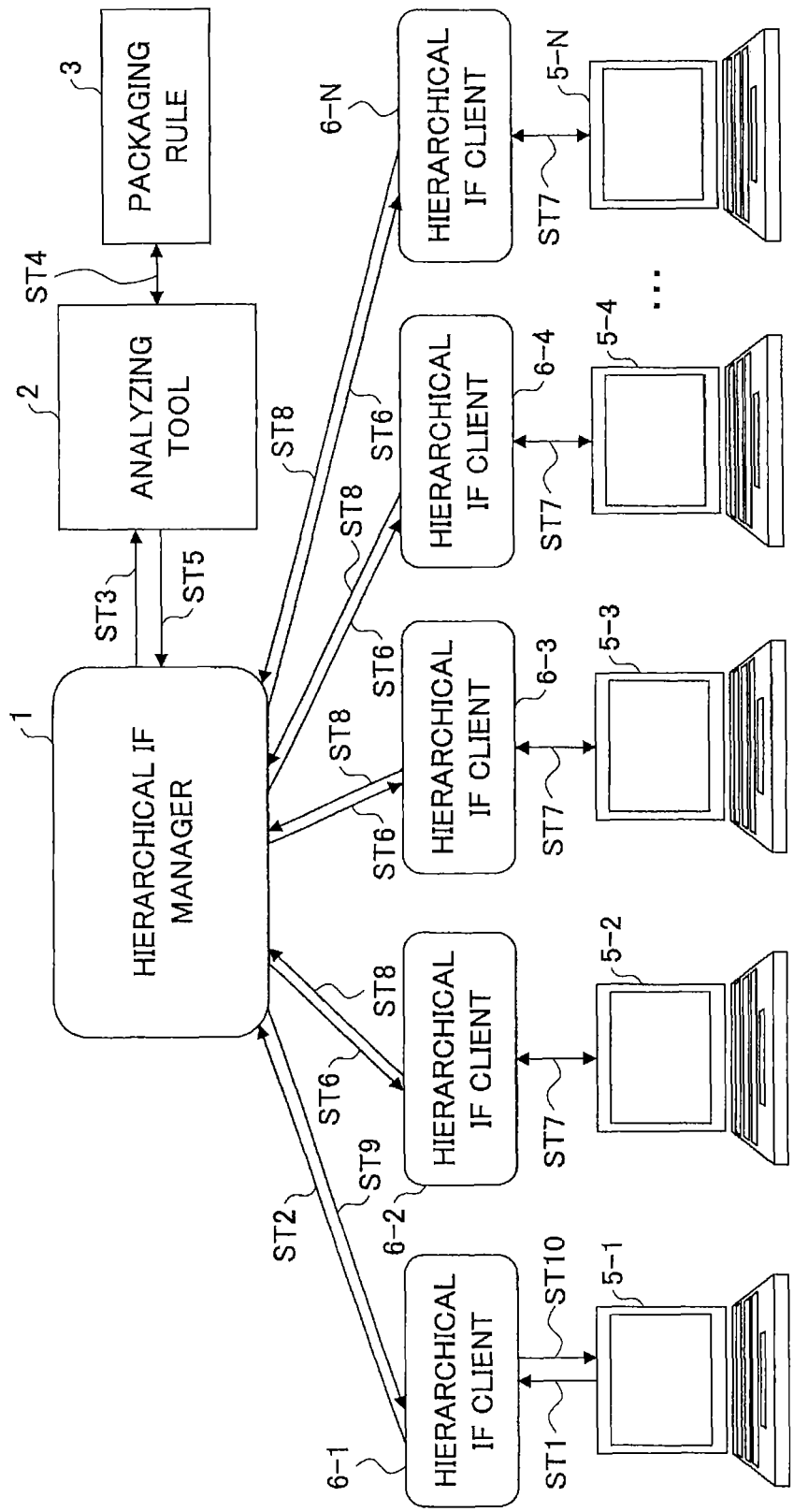
FIG. 3 is a diagram for explaining the process to display the boundary information between the blocks affecting the route.

Next, a description will be given of a process to display boundary information between blocks affecting a route, by referring to FIGS. 2 and 3. FIG. 2 is a diagram illustrating the blocks for explaining the process to display the boundary information between the blocks affecting the route. FIG. 3 is a diagram for explaining the process to display the boundary information between the blocks affecting the route. In FIG. 3, those parts that may be the same as those corresponding parts in FIG. 1 are designated by the same reference numerals, and a description thereof will be omitted.

In FIG. 2, it is assumed for the sake of convenience that a design target circuit 31 may be formed by blocks A, B, C, and D. In the example illustrated in FIG. 2, wirings 312 and 314 may be provided within an affecting range 311 spanning the blocks A, B, and C. The affecting range 311 indicated by a halftone dot pattern may affect the wiring 312. In this example, information to be acquired may be boundary information affecting the wiring 312 at a part indicated by an arrow 313. The block D includes no wiring within the affecting range 311, because the block D is outside the affecting range 311.

In a step ST1 in FIG. 3, the computer 5-1 forming the processing module (that is, design hierarchical level A) of the block A, for example, may request route information of the wiring 312 to the hierarchical IF client 6-1. In a step ST2, the hierarchical IF client 6-1 may request the route information of the wiring 312 to the hierarchical IF manager 1. In a step ST3, the hierarchical IF manager 1 may request the affecting range 311, that may affect the wiring 312, to the analyzing tool 2. In a step ST4, the analyzing tool 2 may make an access to the packaging rule 3, and acquire the affecting range 311 that may affect the wiring 312. In this state, when the wiring 312 is specified as the analyzing target, the affecting range 311 with respect to only the wiring 312 may be acquired.

In a step ST5, the affecting range 311 acquired by the analyzing tool 2 may be notified to the hierarchical IF manager 1. In a step ST6, the hierarchical IF manager 1 may request the boundary information within the affecting range 311 to the hierarchical IF clients 6-2 through 6-N corresponding to the computers 5-2 through 5-N (that is, processing modules of the blocks B, C, and D, other than the block A) other than the computer 5-1 forming the processing module of the block A. In a step ST7, in response to receiving the request from the hierarchical IF manager 1, the hierarchical IF clients 6-2 through 6-N may acquire the boundary information within the affecting range 311 that is stored in the storage unit 52 of each of the corresponding computers 5-2 through 5-N. In the example illustrated in FIG. 2, the wiring 314 may be acquired as the boundary information. In a step ST8, the boundary information within the affecting range 311, acquired by the hierarchical IF clients 6-2 through 6-N, may be notified to the hierarchical IF manager 1. In a step ST9 the hierarchical IF manager 1 may notify a merged result of the boundary information of each of the hierarchical levels acquired by the hierarchical IF manager 1, to the hierarchical IF client 6-1 at the request source. In a step ST10, the hierarchical IF client 6-1 may notify the merged result to the processing module of the block A, and the processing module of the block A may display information of the merged result on the display unit 54 of the computer 5-1.

In the example illustrated in FIG. 2, the design target circuit 31 may be formed by the blocks A, B, C, and D. Hence, the value of N may be N=4 in FIG. 3.

Figure 4:
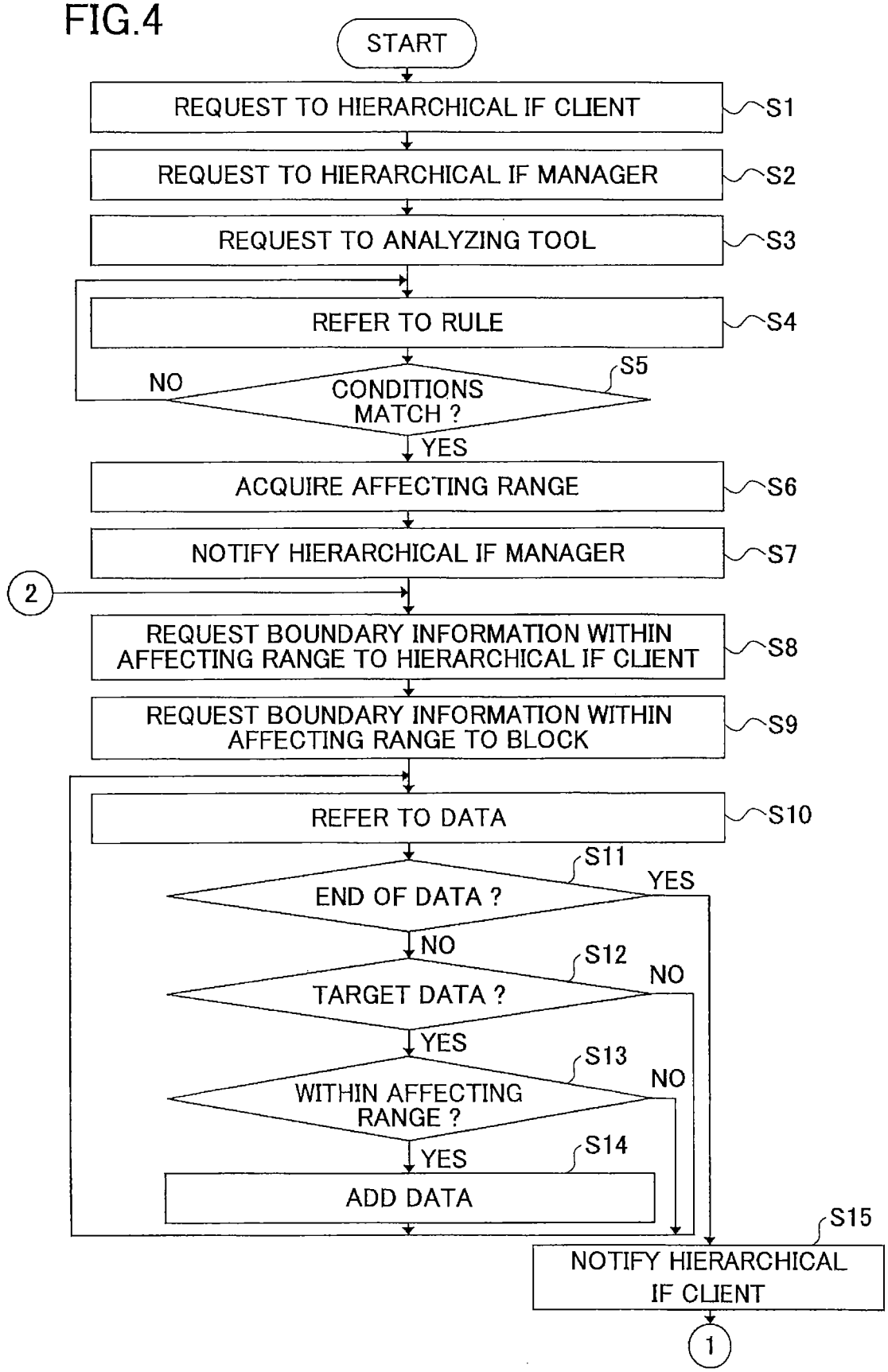
FIGS. 4 and 5 are flow charts for explaining, in more detail, the process to display the boundary information between the blocks affecting the route.
Figure 5:
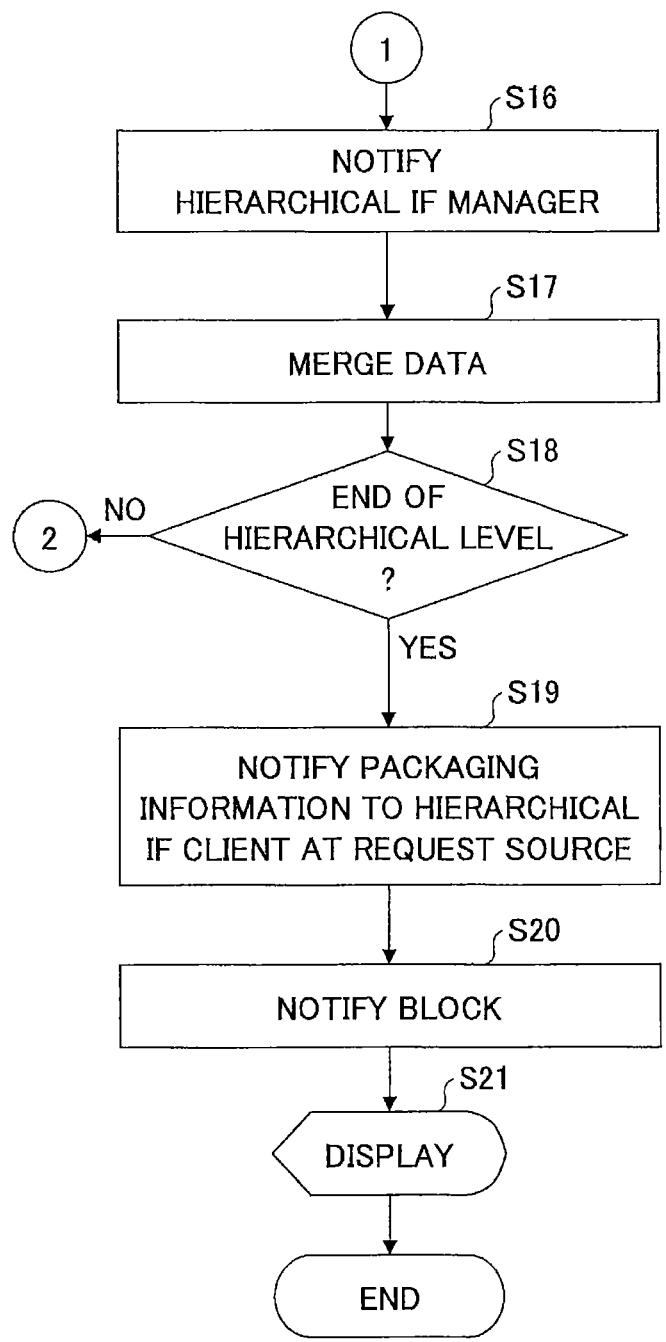

FIGS. 4 and 5 are flow charts for explaining, in more detail, the process to display the boundary information between the blocks affecting the route.

In a step S1 in FIG. 4, the computer 5-1 (or the processing module of the block A) may request the route information of the wiring 312 to the hierarchical IF client 6-1. In a step S2, the hierarchical IF client 6-1 may request the route information of the wiring 312 to the hierarchical IF manager 1. In a step S3, the hierarchical IF manager 1 may request the affecting range 311 that may affect the wiring 312 to the analyzing tool 2.

Steps S4 through S7 may be executed by the analyzing tool 2. In the step S4, the analyzing tool 2 may make an access to the packaging rule 3. In the step S5, the analyzing tool 2 may judge whether conditions of the wiring 312 and conditions of the packaging rule 3 match. When the judgement result in the step S5 is YES, the step S6 may acquire the affecting range 311 that may affect the wiring 312 from the matching conditions of the packaging rule 3. In this state, when the wiring 312 is specified as the analyzing target, the affecting range 311 with respect to only the specified wiring 312 may be acquired. In the step S7, the analyzing tool 2 may notify the acquired affecting range 311 to the hierarchical IF manager 1.

In the step S8, the hierarchical IF manager 1 may request the boundary information within the affecting range 311 to an arbitrary hierarchical IF client 6-$i$ ($i=2, \ldots, N$) amongst the hierarchical IF clients 6-2 through 6-N corresponding to the processing modules (that is, computers 5-2 through 5-N) of the blocks B, C, and D other than the block A. In a step S9, in response to receiving the request from the hierarchical IF manager 1, the arbitrary hierarchical IF client 6-$i$ may request the boundary information within the affecting range 311 stored in the storage unit 52 of the corresponding computer 5-$i$.

Steps S10 through S15 may be executed by an arbitrary computer 5-$i$ amongst the computers 5-2 through 5-N (or processing modules of the blocks B, c, and D) corresponding to the hierarchical IF clients 6-2 through 6-N. In the step S10, a reference may be made to the data stored in the storage unit 52 of the computer 5-$i$, in response to the request from the hierarchical IF client 6-$i$. A step S11 may judge whether the data referred to in the step S10 ended, and the process may advance to a step S15 which will be described later when the judgement result in the step S11 is YES. On the other hand, when the judgement result in the step S11 is NO, a step S12 may judge whether the data referred to in the step S10 is the target data, that is, the data related to the boundary information. The process may advance to the step S15 when the judgement result in the step S12 is NO. When the judgement result in the step S12 is YES, a step S13 may judge whether the data referred to in the step S10 is the data related to the boundary information within the affecting range 311. The process may advance to the step S15 when the judgement result in the step S13 is NO. When the judgement result in the step S13 is YES, a step S14 may add the data referred to in the step S10 to the data that is to be notified to the hierarchical IF client 6-*i* at the request source, and the process may return to the step S10. In the step S15, the data related to the boundary information within the affecting range 311 acquired by the steps S10 through S14 may be notified to the hierarchical IF client 6-*i* at the request source, and the process may advance to a step S16 illustrated in FIG. 5.

In the step S16 in FIG. 5, the boundary information acquired by the hierarchical IF client 6-*i* may be notified to the hierarchical IF manager 1. Steps S17 through S19 may be executed by the hierarchical IF manager 1. In the step S17, the data notified from the hierarchical IF client 6-*i* may be merge with the data already notified to the hierarchical IF manager 1. The step S18 may judge whether the processing of the requests from all of the hierarchical IF clients 6-2 through 6-N other than the hierarchical IF client 6-1 ended. When the judgement result in the step S18 is NO, the process may return to the step S8 illustrated in FIG. 4, in order to similarly perform the processing of the request from the hierarchical IF client for which the processing has not ended. On the other hand, when the judgement result in the step S18 is YES, the step S19 may notify the merged result of the route information gathered from each of the hierarchical levels (that is, each of the blocks A through D) to the hierarchical IF client 6-1 at the request source.

In a step S20, the hierarchical IF client 6-1 may notify the merged result to the processing module of the block A. In a step S21, the processing module of the block A, that is, the computer 5-1, may display information of the merged result on the display unit 54.

Figure 6:
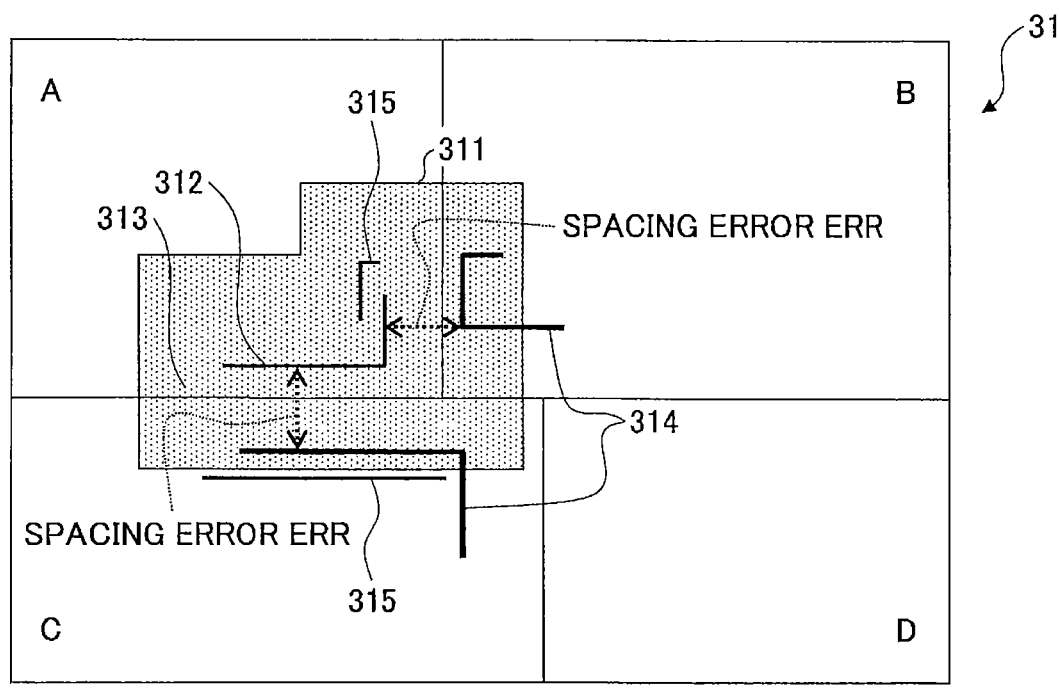
FIGS. 6 and 7 are diagrams illustrating blocks for explaining a process to analyze effects of the route on routes in an adjacent hierarchical level.
Figure 7:
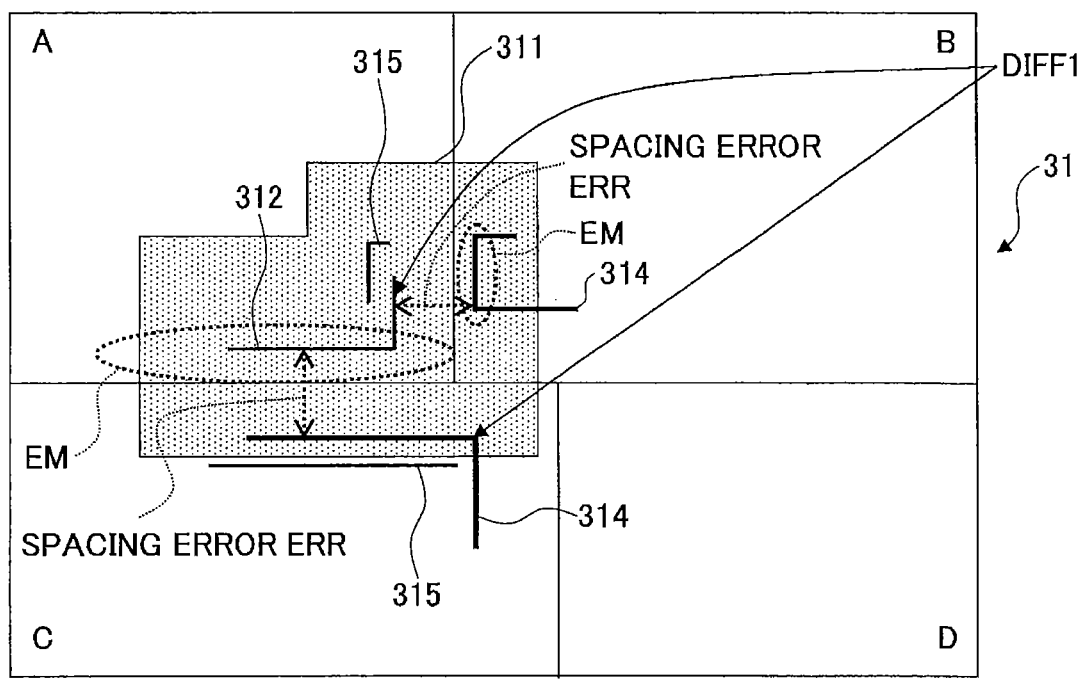
Figure 8:
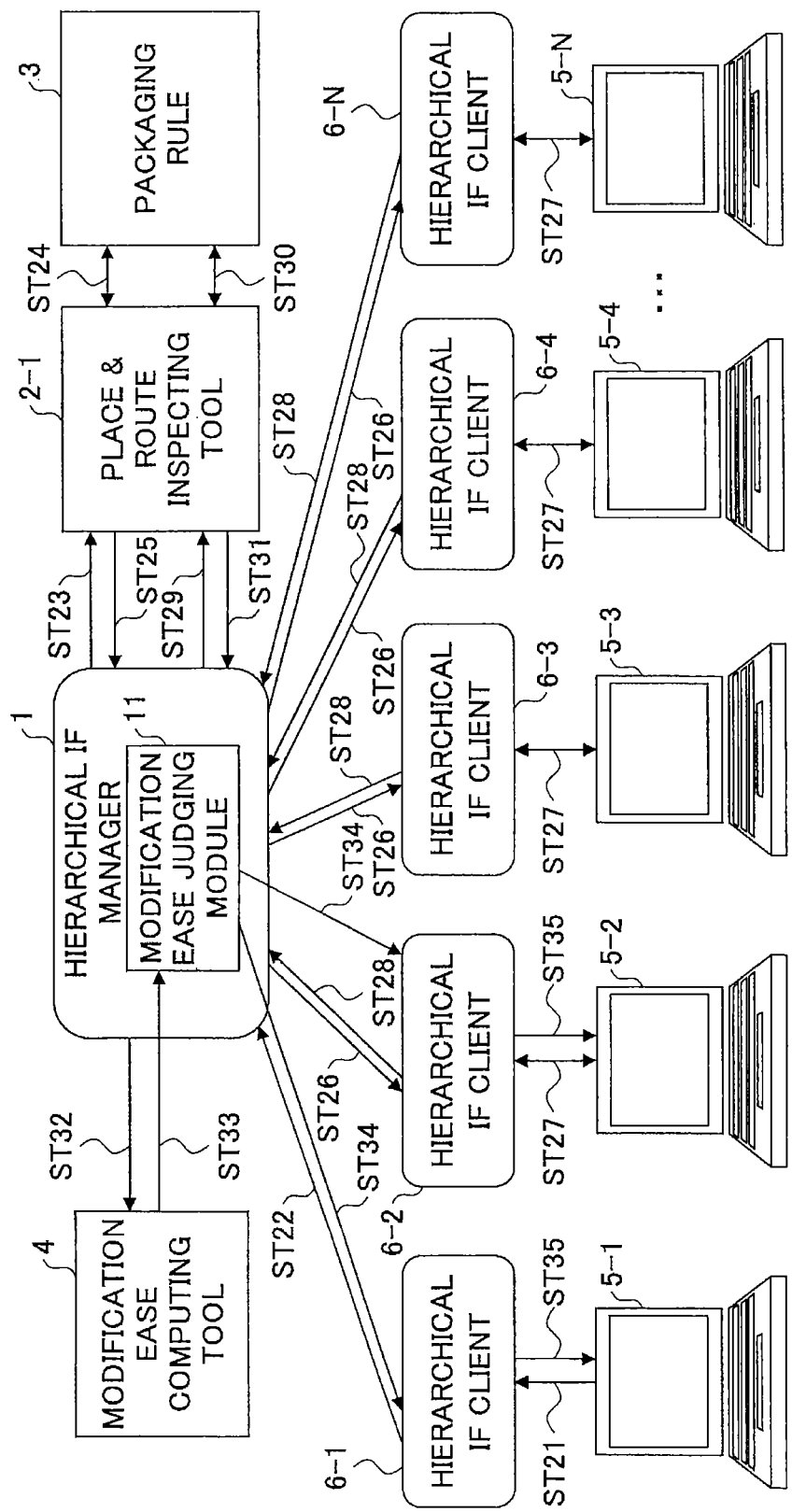
FIG. 8 is a diagram for explaining the process to analyze the effects of the route on the routes in the adjacent hierarchical level.

Next, a description will be given of a process to analyze effects of the route on routes in an adjacent hierarchical level, by referring to FIGS. 6 through 8. FIGS. 6 and 7 are diagrams illustrating blocks for explaining the process to analyze the effects of the route on the routes in the adjacent hierarchical level. In FIGS. 6 and 7, those parts that may be the same as those corresponding parts in FIG. 2 are designated by the same reference numerals, and a description thereof will be omitted. FIG. 8 is a diagram for explaining the process to analyze the effects of the route on the routes in the adjacent hierarchical level. In FIG. 8, those parts that may be the same as those corresponding parts in FIG. 1 are designated by the same reference numerals, and a description thereof will be omitted.

In FIGS. 6 and 7, it is assumed for the sake of convenience that a spacing error ERR exists between the wiring 312 and the adjacent wiring 314. FIG. 7 illustrates a result of judging a possibility of the design modification with respect to the blocks A through D illustrated in FIG. 6.

In a step ST21 in FIG. 8, a request for a wiring analysis result may be made from the computer 5-1 forming the processing module of the block A (that is, designing hierarchical level A), for example, to the hierarchical IF client 6-1. In a step ST22, the hierarchical IF client 6-1 may request the wiring analysis result to the hierarchical IF manager 1. In a step ST23, the hierarchical IF manager 1 may request the affecting range 311 that may affect the wiring 312 to the place and route inspecting tool 2-1 of the analyzing tool 2. In a step ST24, the place and route inspecting tool 2-1 may make an access to the packaging rule 3, and acquire the affecting range 311 that may affect the wiring 312. In this state, when the wiring 312 is specified as the analyzing target, the affecting range 311 with respect to only the wiring 312 may be acquired.

In a step ST25, the route inspecting tool 2-1 may notify the acquired affecting range 311 to the hierarchical IF manager 1. In a step ST26, the hierarchical IF manager 1 may request the boundary information within the affecting range 311 to the hierarchical IF clients 6-2 through 6-N corresponding to the computers 5-2 through 5-N (that is, processing modules of blocks B, C, and D) other than the computer 5-1 forming the processing module of the block A. In a step ST27, in response to receiving the request from the hierarchical IF manager 1, the hierarchical IF clients 6-2 through 6-N may acquire the boundary information within the affecting range 311 stored in the storage unit 52 of the corresponding computers 5-2 through 5-N. In a step ST28, the hierarchical IF clients 6-2 through 6-N may notify the acquired boundary information to the hierarchical IF manager 1. In a step ST29, the hierarchical IF manager 1 may notify the acquired boundary information to the analyzing tool 2. In a step ST30, the place and route inspecting tool 2-1 may make an access to the packaging rule 3 to analyze the boundary information. In a step ST31, the place and route inspecting tool 2-1 may notify the analysis result to the hierarchical IF manager 1.

In a step ST32, the hierarchical IF manager 1 may notify the error location within the analysis result, such as the spacing error ERR between the wiring 312 and the adjacent wiring 314 in FIG. 6, for example, to the modification ease computing tool 4. In a step ST33, the modification ease computing tool 4 may compute the modification ease of the design (or design modification ease) for each of the blocks (or each of the hierarchical levels) A through D, and notify the design modification ease to the hierarchical IF manager 1. In a step ST34, a modification ease judging module 11 within the hierarchical IF manager 1 may judge the design modification ease of each of the blocks A through D, and notify the analysis result including the error information to the hierarchical IF client in the hierarchical level having a relatively high design modification ease. In this state, when the priority order is specified for the wiring or the hierarchical level, the design modification ease may be judged by taking the priority order into consideration. In this example, the hierarchical IF manager 1 may notify the analysis result to the hierarchical IF clients 6-1 and 6-2 in the step ST34. In a step ST35, each of the hierarchical IF clients 6-1 and 6-2 that are notified of the analysis result from the hierarchical IF manager 1 may notify the analysis result to the processing modules of the corresponding blocks A and B, that is, the computers 5-1 and 5-2, and the computers 5-1 and 5-2 may display on the display units 54 thereof information related to the blocks A through D, including the analysis result illustrated in FIG. 7, for example. In FIG. 7, DIFF indicates a part where the wiring 312 or the wiring 314 and a wiring 315 are adjacent and the design modification may be difficult. In addition, a predetermined range EM surrounded by dotted lines in FIG. 7 indicates a region in which the design modification to suppress the spacing error ERR may easily be achieved. Accordingly, the predetermined range EM in which the design modification may easily be achieved may be judged as being the spacing error and notified to a hierarchical level in which the design modification is preferable.

Figure 9:
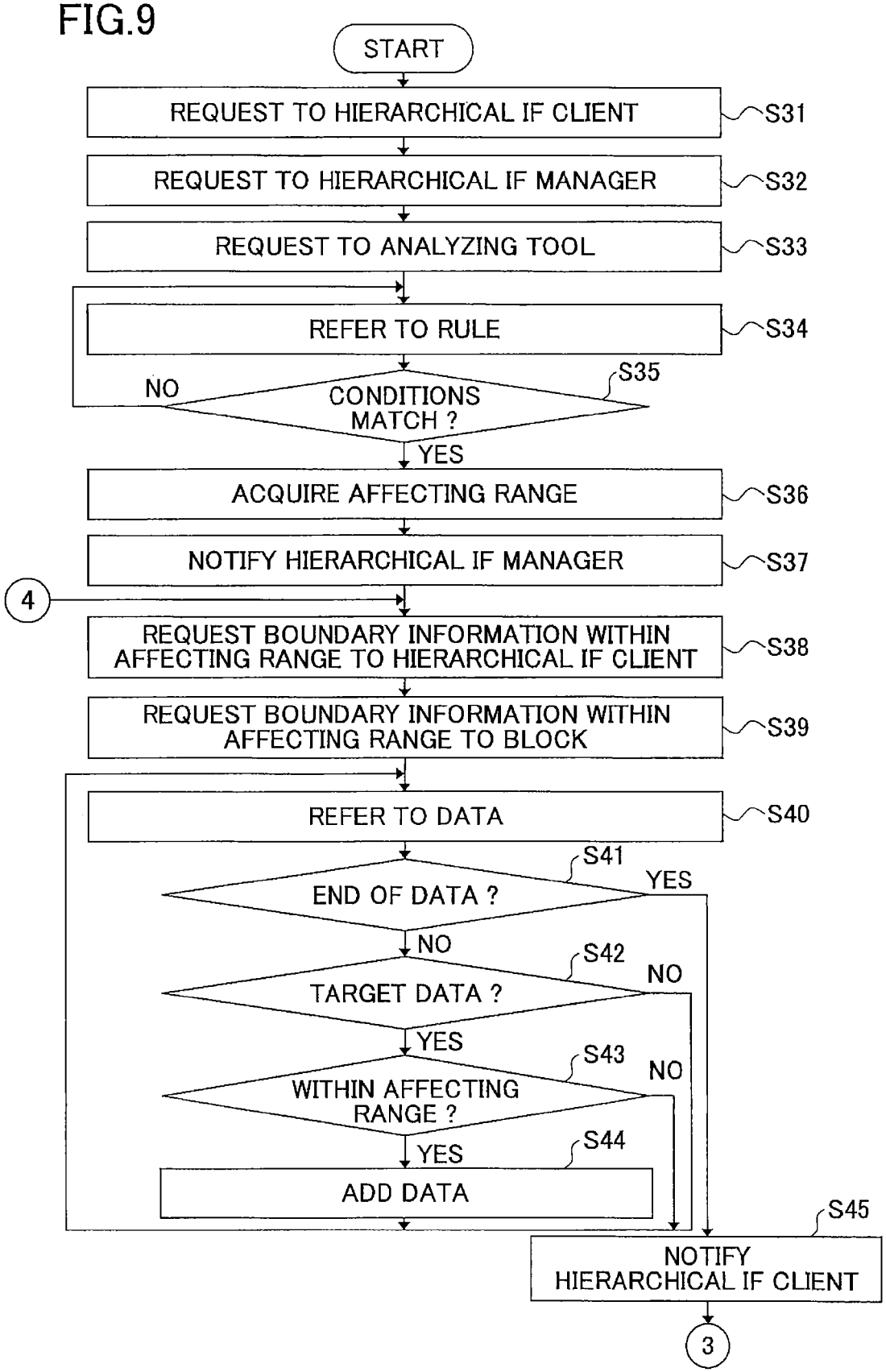
FIGS. 9 and 10 are flow charts for explaining, in more detail, the process to analyze the effects of the route on the routes in the adjacent hierarchical level.
Figure 10:
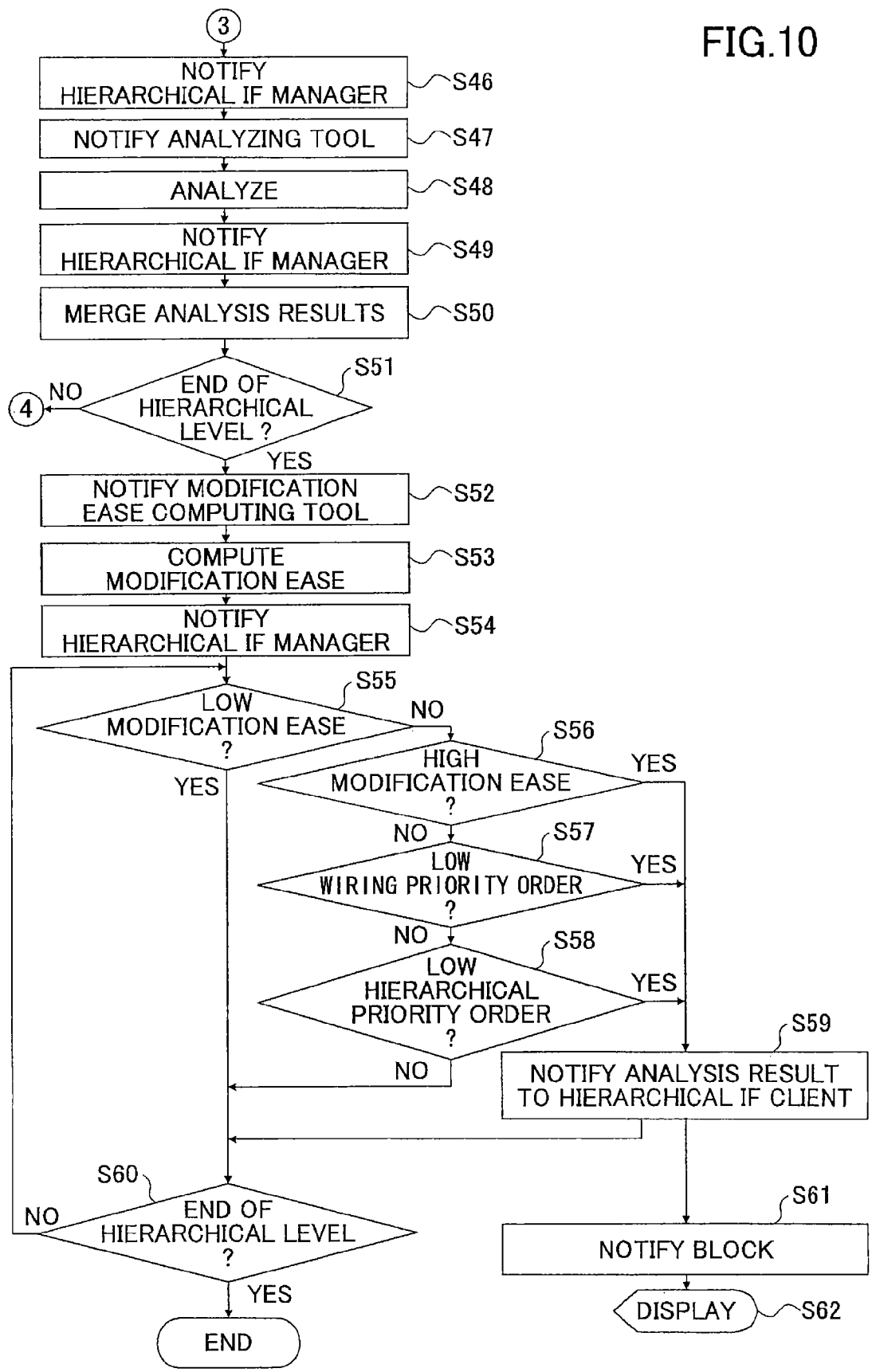

FIGS. 9 and 10 are flow charts for explaining, in more detail, the process to analyze the effects of the route on the routes in the adjacent hierarchical level.

In FIG. 9, processes of steps S31 trough S45 may be similar to the processes of the steps S1 through S15 illustrated in FIG. 4, and a description thereof will be omitted.

In FIG. 10, in a step S46, the hierarchical IF client 6-1 may notify the boundary information acquired thereby to the hierarchical IF manager 1. In a step S47, the hierarchical IF manager 1 may notify the boundary information notified from the hierarchical IF client 6-1 to the place and route inspecting tool 2-1. Steps S48 and S49 may be executed by the analyzing tool 2. In the step S48, the place and route inspecting tool 2-1 may make an access to the packaging rule 3 and analyze the boundary information. In the step S49, the place and route inspecting tool 2-1 may notify the analysis result to the hierarchical IF manager 1.

Steps S50 through S52 may be executed by the hierarchical IF manager 1. In the step S50, the hierarchical IF manger 1 may merge the analysis result of the place and route inspecting tool 2-1 with respect to the boundary information acquired by the hierarchical IF client 6-1 and the analysis result already notified to the hierarchical IF manager 1. In the step S51, the hierarchical IF manager 1 may judge whether the processing of the requests from all of the hierarchical IF clients 6-2 through 6-N other than the hierarchical IF client 6-1 ended. When the judgement result in the step S51 is NO, the process may return to the step S38 illustrated in FIG. 9, in order to similarly perform the processing of the request from the hierarchical IF client for which the processing has not ended. On the other hand, when the judgement result in the step S51 is YES, the step S52 may notify the merged result of the analysis results of the boundary information gathered from each of the hierarchical levels (that is, each of the blocks A through D) to the modification ease computing tool 4. The merged result notified to the modification ease computing tool 4 may include the error location within the analysis result, such as the spacing error ERR between the wiring 312 and the adjacent wiring 314 illustrated in FIG. 6, for example.

Steps S53 and S54 may be executed by the modification ease computing tool 4. In the step S53, the design modification ease may be computed for each of the blocks (each of the hierarchical levels) A through D. In the step S54, the computed design modification ease may be notified to the hierarchical IF manager 1.

Steps S55 through S60 may be executed by the hierarchical IF manager 1. In the step S55, the modification ease judging module 11 may judge whether the design modification ease of each of the blocks A through D is lower than a predetermined value and relatively low. The process may advance to the step S56 when the judgement result in the step S55 is NO, and the process may advance to the step S60 when the judgement result in the step S55 is YES. In the step S56, the modification ease judging module 11 may judge whether the design modification ease of each of the blocks A through D is higher than a predetermined value and relatively high. The process may advance to the step S57 when the judgement result in the step S56 is NO, and the process may advance to the step S69 when the judgement result in the step S56 is YES. In the step S57, the hierarchical IF manager 1 may judge whether the priority order specified for the wiring of each of the blocks A through D is lower than a predetermined value and relatively low. The process may advance to the step S58 when the judgement result in the step S57 is NO, and the process may advance to the step S59 when the judgement result in the step S57 is YES. In the step S58, the hierarchical IF manager 1 may judge whether the priority order specified for the hierarchical level of each of the blocks A through D is lower than a predetermined value and relatively low. The process may advance to the step S60 when the judgement result in the step S58 is NO, and the process may advance to the step S59 when the judgement result in the step S58 is YES. In the step S59, the analysis result including the error information may be notified to the hierarchical IF client of the hierarchical level in which the design modification ease is relatively high, and the process may advance to the steps S60 and S61. In this example, the hierarchical IF manager 1 notifies the analysis result to the hierarchical IF clients 6-1 and 6-2 in the step S59. The step S60 may judge whether the judgement of the design modification ease with respect to the computed results of all of the hierarchical levels (that is, all of the blocks A through D) notified from the modification ease computing tool 4 ended. The process may return to the step S55 when the judgement result in the step S60 is NO, and the process may end when the judgement result in the step S60 is YES.

On the other hand, in a step S61, each of the hierarchical IF clients 6-1 and 6-2 that receive the analysis result notified from the hierarchical IF manager 1 may notify the analysis result to the processing modules of the corresponding blocks A and B, that is, the computers 5-1 and 5-2. In addition, in a step S62, the computers 5-1 and 5-2 may display the information related to the blocks A through D, including the analysis result illustrated in FIG. 7, for example, on the display units 54 thereof.

Figure 11:
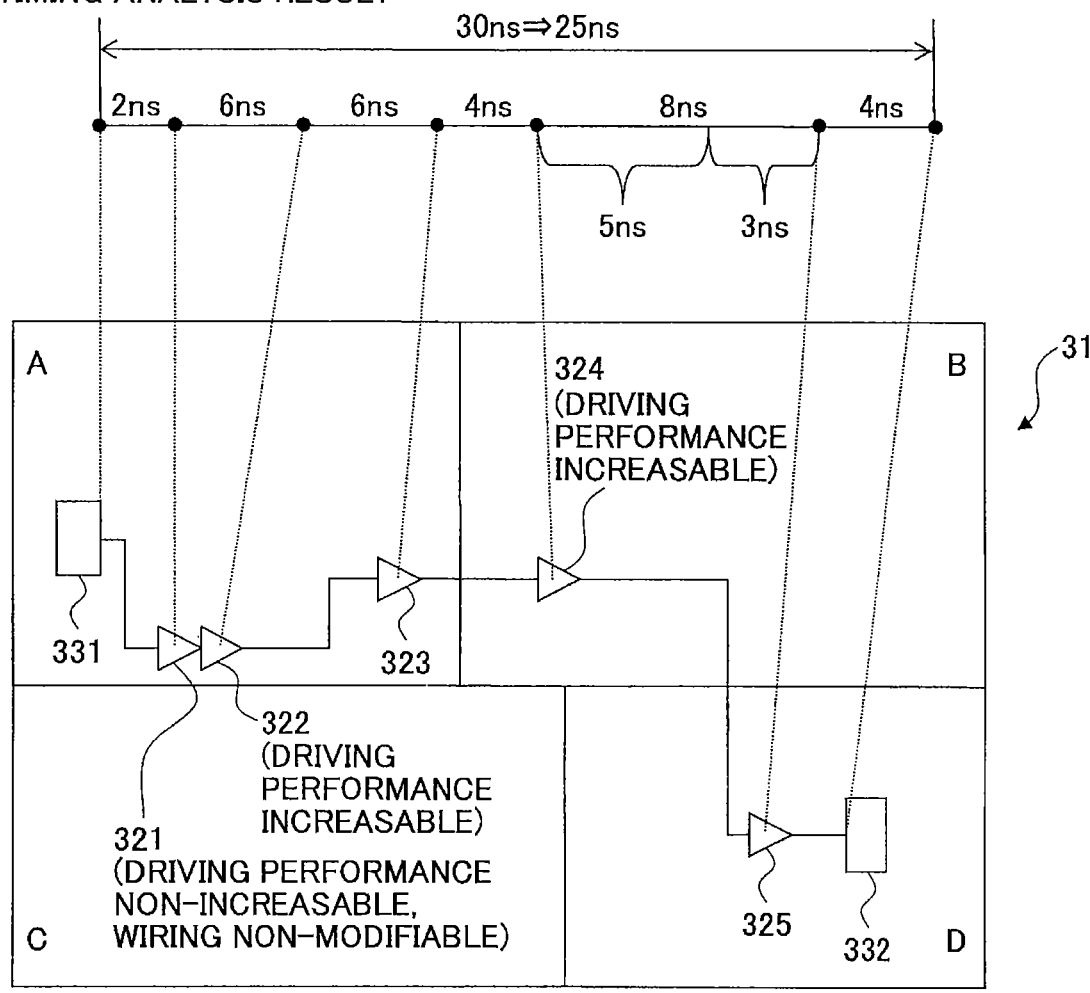
FIGS. 11 and 12 are diagrams illustrating blocks for explaining a process to analyze timings of signals transferred in a path spanning hierarchical levels.
Figure 12:
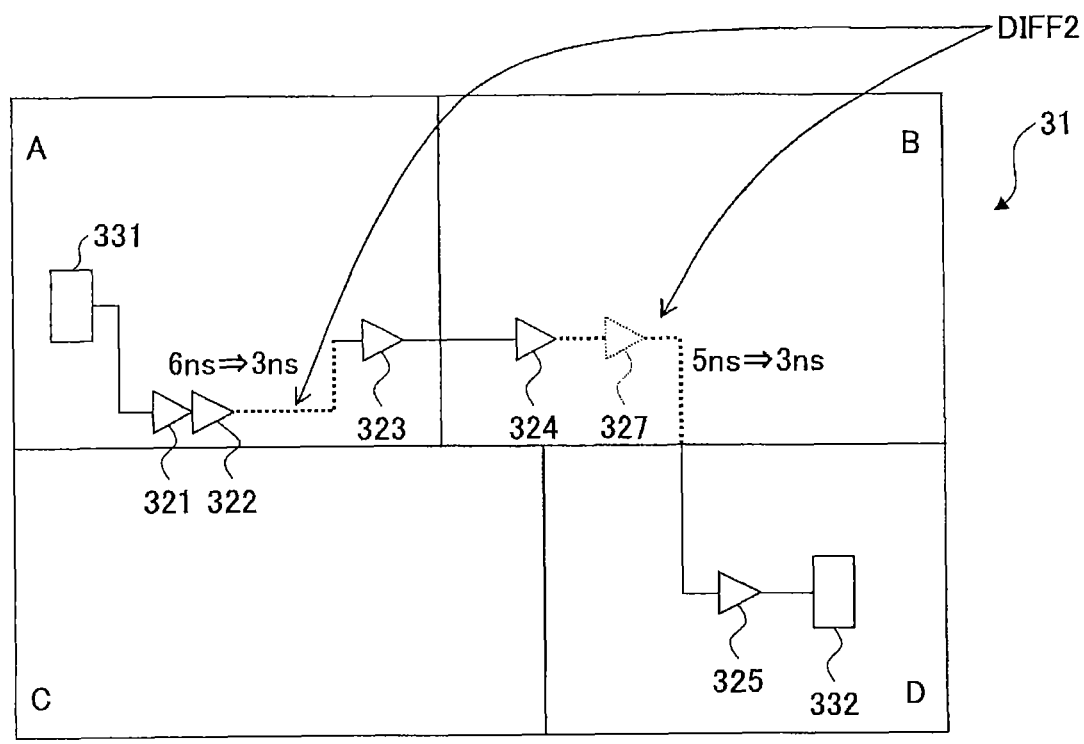
Figure 13:
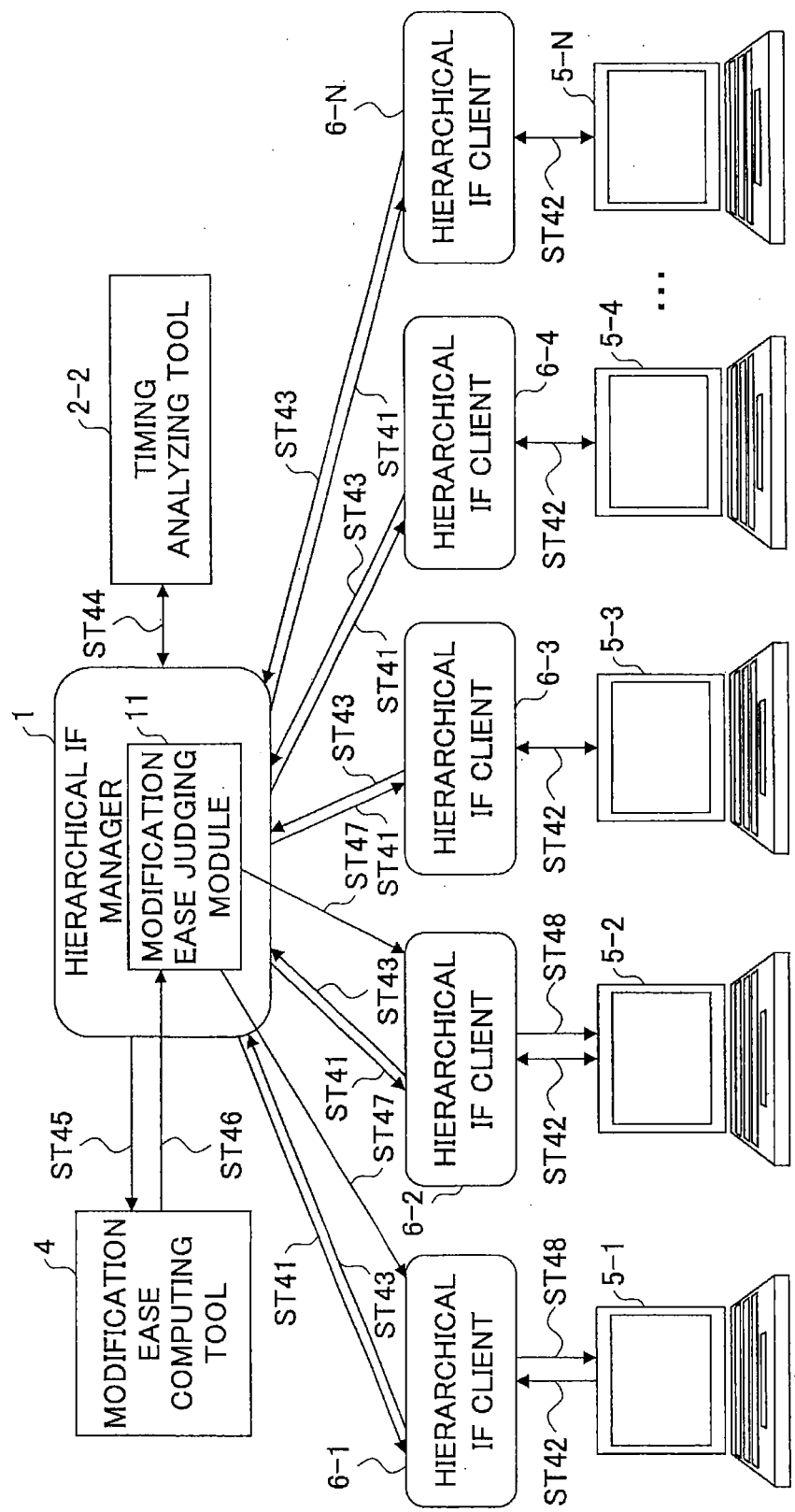
FIG. 13 is a diagram for explaining the process to analyze the timings of the signals transferred in the path spanning the hierarchical levels.

Next, a description will be given of a process to analyze timings of signals transferred in a path spanning hierarchical levels, by referring to FIGS. 11 through 13. FIGS. 11 and 12 are diagrams illustrating blocks for explaining the process to analyze the timings of the signals transferred in the path spanning the hierarchical levels. In FIGS. 11 and 12, those parts that may be the same as those corresponding parts in FIG. 2 are designated by the same reference numerals, and a description thereof will be omitted. FIG. 13 is a diagram for explaining the process to analyze the timings of the signals transferred in the path spanning the hierarchical levels. In FIG. 13, those parts that may be the same as those corresponding parts in FIG. 1 are designated by the same reference numerals, and a description thereof will be omitted.

In FIGS. 11 and 12, it is assumed for the sake of convenience that three buffers 321 through 323 within the block A, one buffer 324 within the block B, and one buffer 325 within the block D are connected in series by wirings. It is also assumed that the driving performance of the buffer 321 is not increasable, the wirings are not modifiable, and the driving performances of the buffers 322 and 324 are increasable. An upper part of FIG. 11 illustrates an analysis result including signal delay times from a terminal 331 within the block A to a terminal 332 within the block D. FIG. 12 illustrates a result of judging the design modification ease with respect to the blocks A through D of FIG. 11.

In a step ST41 in FIG. 13, the hierarchical IF manager 1 may request the information within the blocks A through D of an analyzing target path, that is, connecting path information, to the hierarchical IF clients 6-1 through 6-N. In a step ST42, in response to receiving the request from the hierarchical IF manager 1, the hierarchical IF clients 6-1 through 6-N may acquire the connecting path information cored in the storage unit 52 of the corresponding computers 5-1 through 5-N. In a step ST43, the hierarchical IF clients 6-1 through 6-N may notify the acquired connecting path information to the hierarchical IF manager 1. In a step ST44, the hierarchical IF manager 1 may merge the connecting path information collected from the hierarchical IF clients 6-1 through 6-N, request analysis to the timing analyzing tool 2-2, and receive a timing analysis result from the timing analyzing tool 2-2. In a step ST45, the hierarchical IF manager 1 may notify the timing analysis result to the modification ease computing tool 4.

In a step ST46, the modification ease computing tool 4 may compute the design modification ease with respect to each of the hierarchical levels, and notify the computed results to the hierarchical IF manager 1. In a step ST47, the hierarchical IF manager 1 may judge the design modification ease of each of the hierarchical levels, and notify the timing analysis result including the error information to the hierarchical IF client of the hierarchical level in which the design modification ease is relatively high. In this state, when the priority order of the wiring and the hierarchical level is specified, the design modification ease may be judged by taking the priority order into consideration. In this example, the hierarchical IF manager 1 may notify the timing analysis result to the hierarchical IF clients 6-1 and 6-2 in the step ST47. In a step ST48, the hierarchical IF clients 6-1 and 6-2 notified of the timing analysis result from the hierarchical IF manager 1 may notify the timing analysis result to the processing modules of the corresponding blocks A and B, that is, the computers 5-1 and 5-2, and the computers 5-1 and 5-2 may display the information related to the blocks A through D, including the timing analysis result illustrated in FIG. 12, for example, on the display units 54 thereof. In FIG. 12, dotted lines DIFF2 indicate locations where an adjacent wiring exists and the design modification may be difficult. FIG. 12 illustrates an example in which a part where a delay time is 6 ns in FIG. 11 may be shortened to a delay time of 3 ns by increasing the driving performance of the buffer 322, and a part where a delay time is 5 ns in FIG. 11 may be shortened to a delay time of 3 ns by adding the buffer 327 to an output side of the buffer 324 within the block B. Accordingly, in this example, the delay time between the terminals 331 and 332 may be shorted from 30 ns to 25 ns.

Figure 14:
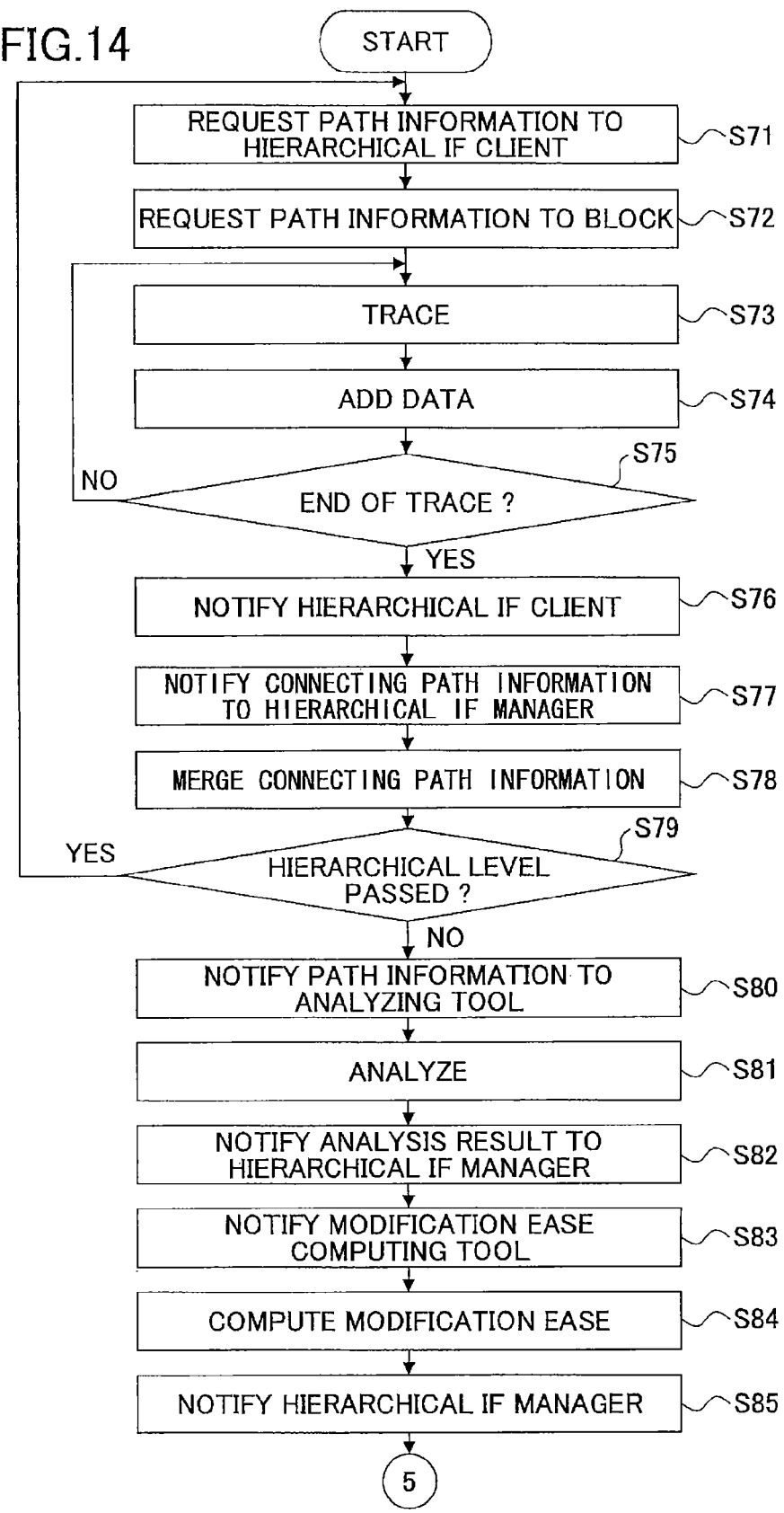
FIGS. 14 and 15 are flow charts for explaining, in more detail, the process to analyze the timings of the signals transferred in the path spanning the hierarchical levels.
Figure 15:
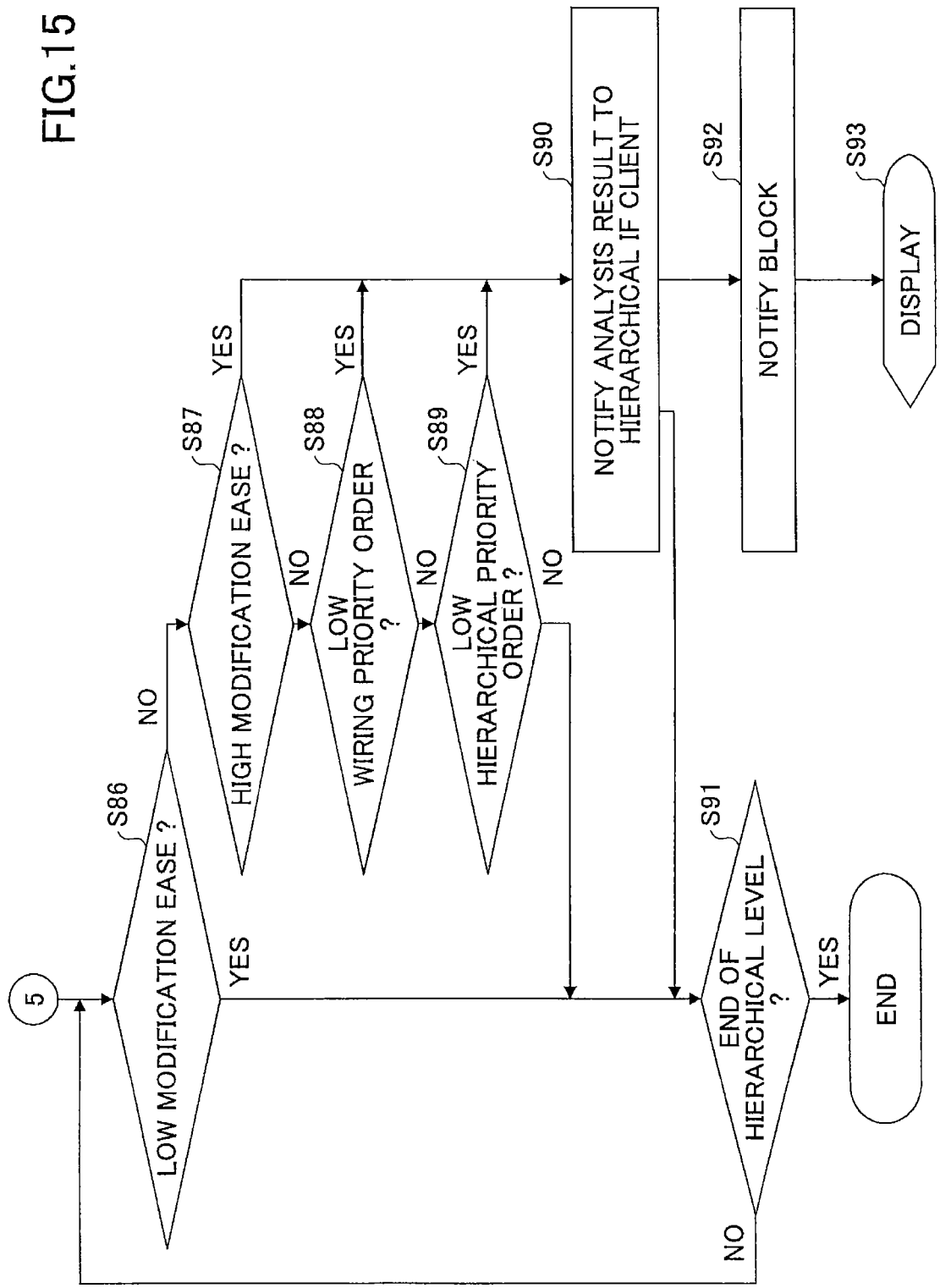

FIGS. 14 and 15 are flow charts for explaining, in more detail, the process to analyze the timings of the signals transferred in the path spanning the hierarchical levels.

In a step S71 in FIG. 14, the hierarchical IF manager 1 may request the information within the blocks A through D of the analyzing target path, that is, the connecting path information, to the hierarchical IF clients 6-1 through 6-N. In a step S72, in response to receiving the request from the hierarchical IF manager 1, the hierarchical IF clients 6-1 through 6-N may request the connecting path information to the corresponding computers 5-1 through 5-N.

Steps S73 through S76 may be executed by the processing modules of the blocks A through D, that is, the computers 5-1 through 5-N. In the step S73, each of the computers 5-1 through 5-N may trace the path within the corresponding blocks A through D. In the step S74, each of the computers 5-1 through 5-N may add information related to the traced path to the path connecting information, and store the path connecting information with the added information in the storage unit 52 thereof. In the step S75, each of the computers 5-1 through 5-N may judge whether the tracing of the path within the corresponding blocks A through D ended. The process may return to the step S73 when the judgement result in the step S75 is NO. On the other hand, the process advances to the step S76 when the judgement result in the step S75 is YES. In the step S76, each of the computers 5-1 through 5-N may read the connecting path information from the corresponding storage unit 52 and notify the connecting path information to the corresponding hierarchical IF clients 6-1 through 6-N.

In a step S77, the hierarchical IF clients 6-1 through 6-N may notify the acquired connecting path information to the hierarchical IF manager 1. Steps S78 through S80 may be executed by the hierarchical IF manager 1. In the step S78, the hierarchical IF manager 1 may merge the collected connection path information. In the step S79, the hierarchical IF manager 1 may judge whether a hierarchical level is passed (that is, a block is passed), and the process may return to the step S71 when the judgement result in the step S79 is YES. On the other hand, the process advances to the step S80 when the judgement result in the step S79 is NO. In the step S80, the hierarchical IF manager 1 may notify the merged result of the connecting path information to the timing analyzing tool 2-2 of the analyzing tool 2, and request the timing analysis.

Steps S81 and S82 may be executed by the analyzing tool 2. In the step S81, the timing analyzing tool 2-2 may perform a timing analysis on the merged result of the connecting path information, based on the request for the timing analysis. In the step S82, the timing analyzing tool 2-2 may notify the timing analysis result to the hierarchical IF manager 1. In a step S83, the hierarchical IF manager 1 may notify the acquired timing analysis result to the modification ease computing tool 4. Steps S84 and S85 may be executed by the modification ease computing tool 4. In the step S84, the modification ease computing tool 4 may compute the design modification ease for each of the hierarchical levels. In the step S85, the modification ease computing tool 4 may notify the computed results to the hierarchical IF manger 1, and the process may advance to the step S86 illustrated in FIG. 15.

In FIG. 15, steps S86 through S93 may be similar to the steps S55 through S62 illustrated in FIG. 10, and a description thereof will be omitted.

Figure 16:
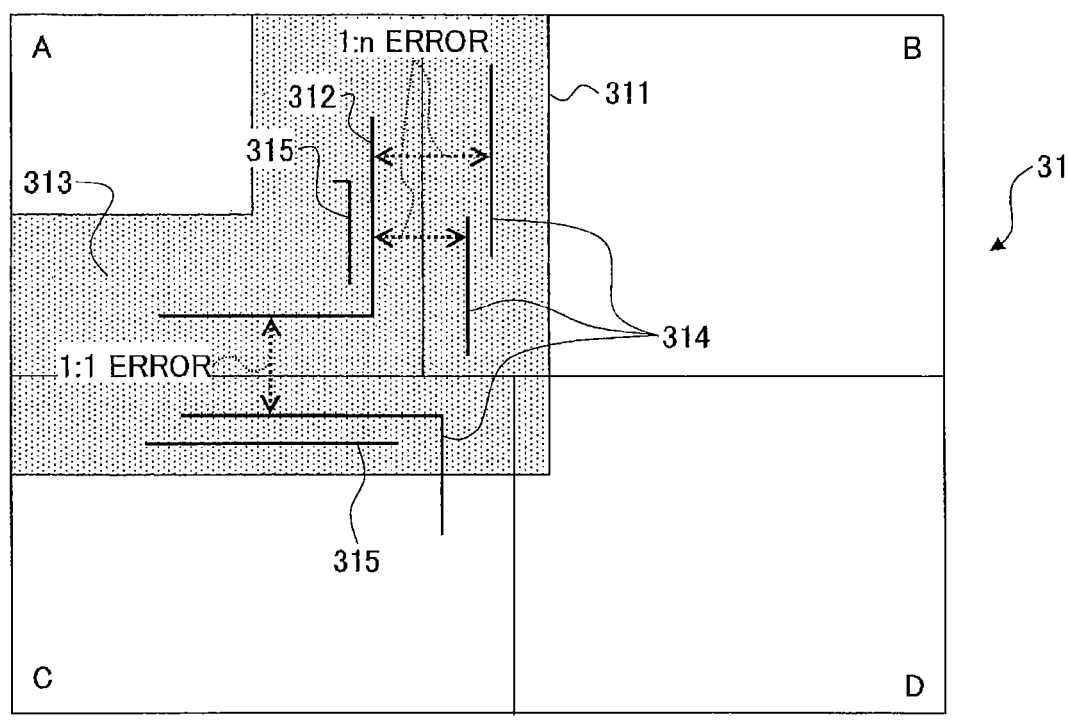
FIGS. 16 and 17 are diagrams illustrating blocks for explaining a process to analyze wiring noise.
Figure 17:
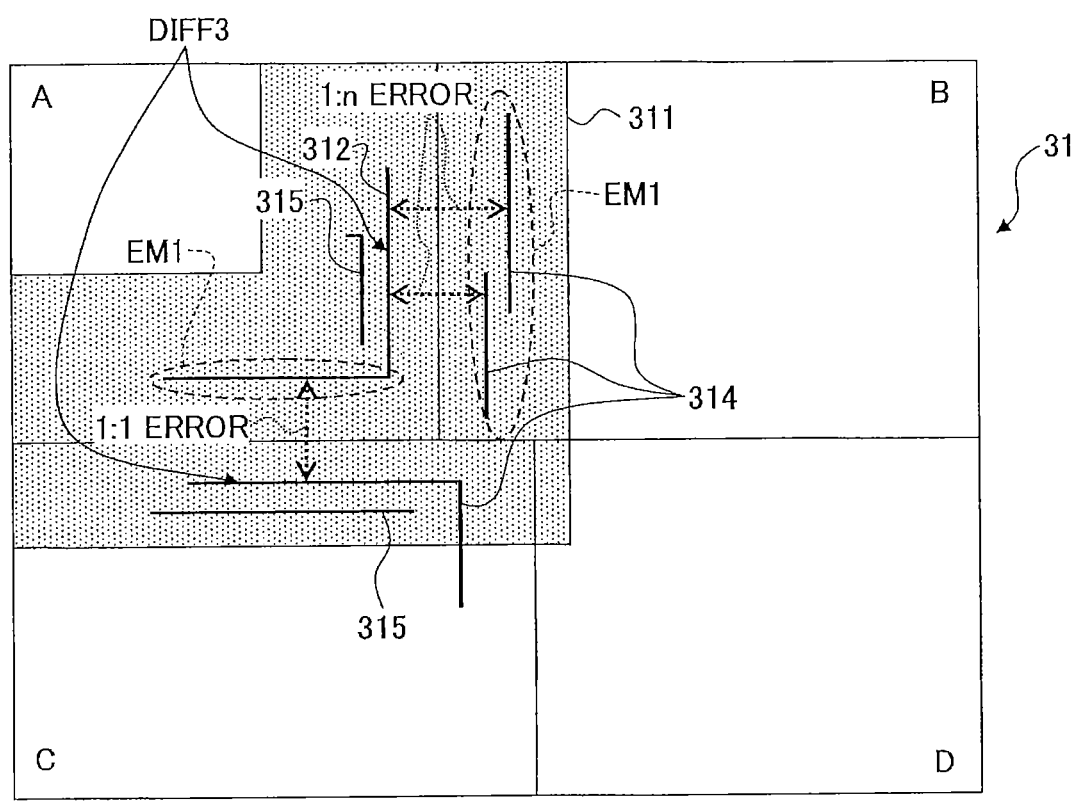
Figure 18:
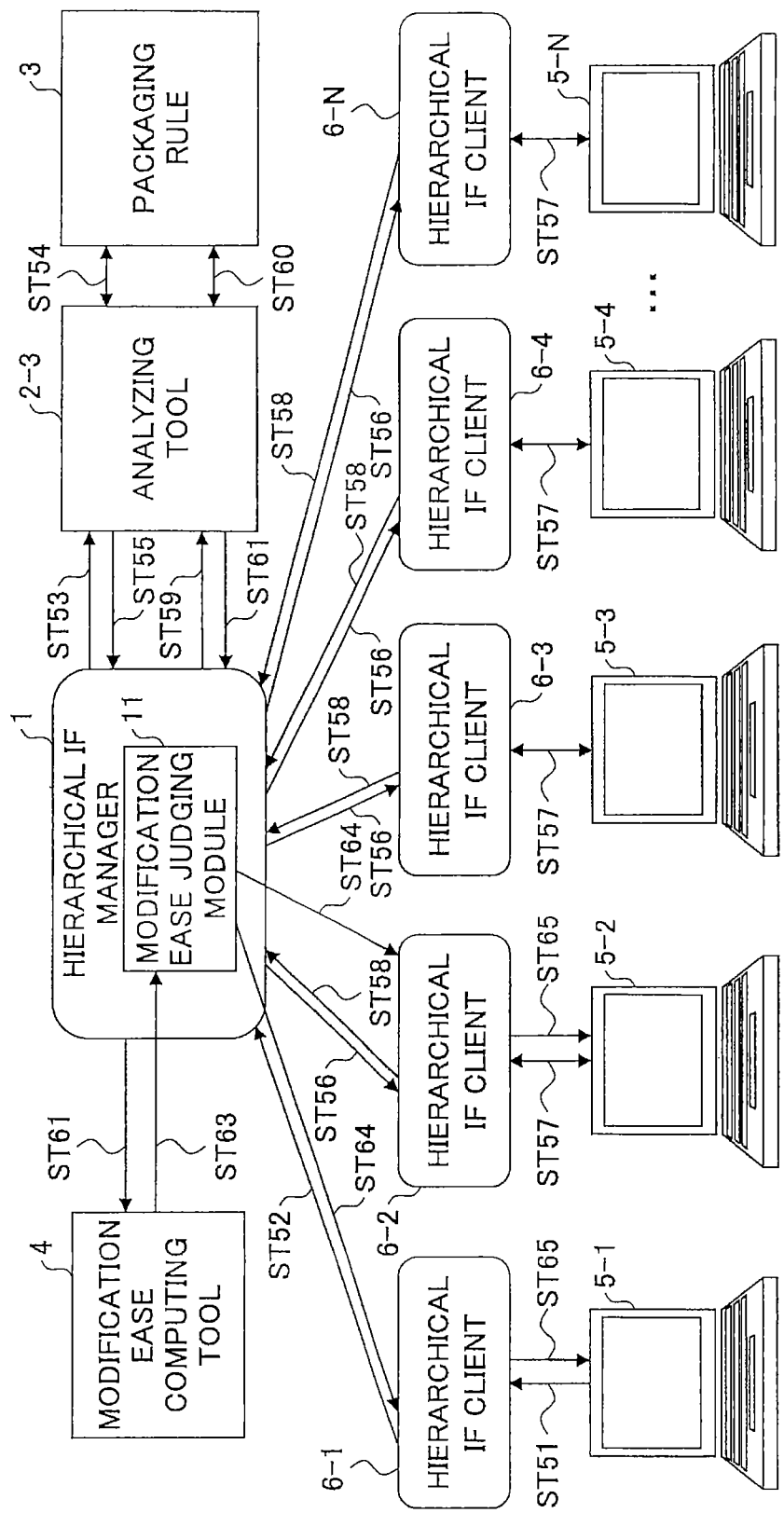
FIG. 18 is a diagram for explaining the process to analyze the wiring noise.

Next, a description will be given of a process to analyze wiring noise, by referring to FIGS. 16 through 18. FIGS. 16 and 17 are diagrams illustrating blocks for explaining the process to analyze the wiring noise. In FIGS. 16 and 17, those parts that may be the same as those corresponding parts in FIG. 2 are designated by the same reference numerals, and a description thereof will be omitted. FIG. 18 is a diagram for explaining the process to analyze the wiring noise. In FIG. 18, those parts that may be the same as those corresponding parts in FIG. 1 are designated by the same reference numerals, and a description thereof will be omitted.

In FIGS. 16 and 17, it is assumed for the sake of convenience that a 1:1 error or a 1:n error exists between the wiring 312 and the adjacent wiring 314. FIG. 17 illustrates a result of judging the possibility of the design modification with respect to the blocks A through D illustrated in FIG. 16.

In a step ST51 in FIG. 18, a request for a noise analysis result of the wiring information may be made from the design hierarchical level A to the hierarchical IF client 6-1. In a step ST52, the hierarchical IF client 6-1 may request the noise analysis result to the hierarchical IF manager 1. In a step ST53, the hierarchical IF manager 1 may request the affecting range 311 that may affect the wiring to the noise analyzing tool 2-3 of the analyzing tool 2. In a step ST54, the noise analyzing tool 2-3 may make an access to the packaging rule 3, and acquire the affecting range 311 that may affect the wiring. In this state, when the wiring 312 is specified as the analyzing target, the affecting range 311 with respect to only the wiring 312 may be acquired.

In a step ST55, the noise analyzing tool 2-3 may notify the acquired affecting range 311 to the hierarchical IF manager 1. In a step ST56, the hierarchical IF manager 1 may request the boundary information within the affecting range 311 to the hierarchical IF clients 6-2 through 6-N other than the block A. In a step ST57, in response to receiving the request from the hierarchical IF manager 1, each of the hierarchical IF clients 6-2 through 6-N may acquire the boundary information within the affecting range 311 stored in the storage unit 52 within the corresponding computers 5-2 through 5-N. In a step ST58, the hierarchical IF clients 6-2 through 6-N may notify the acquired boundary information within the affecting range 311 to the hierarchical IF manager 1. In a step ST59, the hierarchical IF manager 1 may notify the acquired boundary information within the affecting range 311 of each of the hierarchical levels to the noise analyzing tool 2-3.

In a step ST60, the noise analyzing tool 2-3 may make an access to the packaging rule 3 and analyze the boundary information within the affecting range 311. In a step ST61, the noise analyzing tool 2-3 may notify the analysis result of the boundary information within the affecting range 311 to the hierarchical IF manager 1. In a step ST62, the hierarchical IF manager 1 may notify the error location within the analysis result to the modification ease computing tool 4. In a step ST63, the modification ease computing tool 4 may compute the design modification ease for each of the hierarchical levels, and notify the computed results to the hierarchical IF manager 1. In a step ST64, the hierarchical IF manager 1 may judge the design modification ease of each of the hierarchical levels by the modification ease judging module 11, and notify the analysis result including the error information to the hierarchical IF client in the hierarchical level having a relatively high design modification ease. In this state, when the priority order of the wiring or the hierarchical level is specified, the design modification ease may be judged by taking the priority order into consideration. In this example, the hierarchical IF manager 1 may notify the analysis result to the hierarchical IF clients 6-1 and 6-2 in the step ST64. In a step ST65, each of the hierarchical IF clients 6-1 and 6-2 that receives the notification of the analysis result from the hierarchical IF manager 1 may notify the analysis result to the processing modules of the corresponding blocks A and B, that is, the computes 5-1 and 5-2, and the computers 5-1 and 5-2 may display the information of the blocks A through D, including the analysis result illustrated in FIG. 17, for example, on the display units 54 thereof. In FIG. 17, DIFF3 indicates a location where the wiring 312 or the wiring 314 is adjacent to the wiring 315 and the design modification may be difficult. In addition, in FIG. 17, a predetermined range EM1 surrounded by a dotted line indicates a region in which the design modification to suppress the 1:1 or 1:n error may easily be achieved. Accordingly, the predetermined range EM1 in which the design modification may easily be achieved may be judged as being the error and notified to the hierarchical level in which the design modification is preferable.

Figure 19:
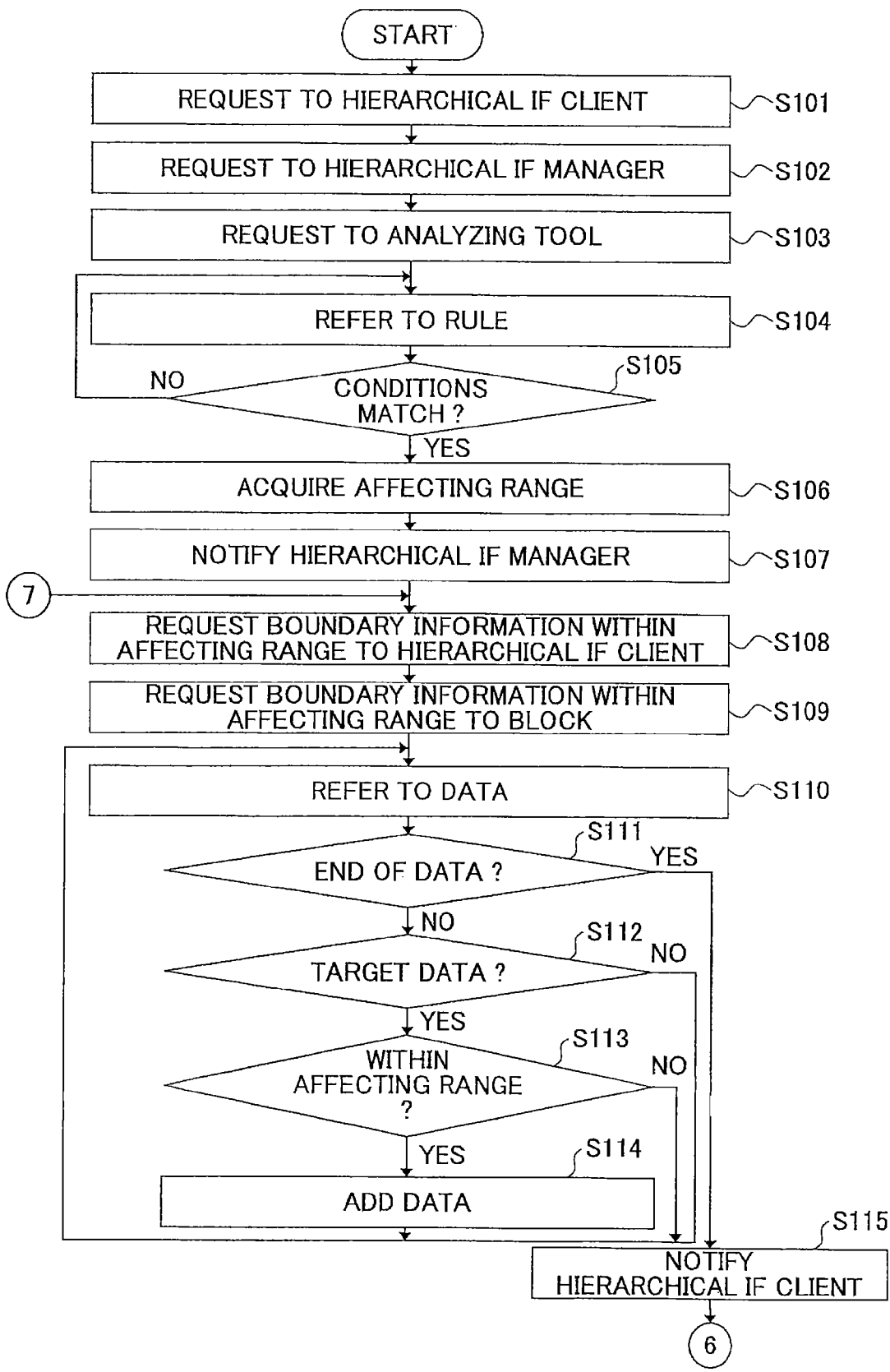
FIGS. 19 and 20 are flow charts for explaining, in more detail, the process to analyze the wiring noise.
Figure 20:
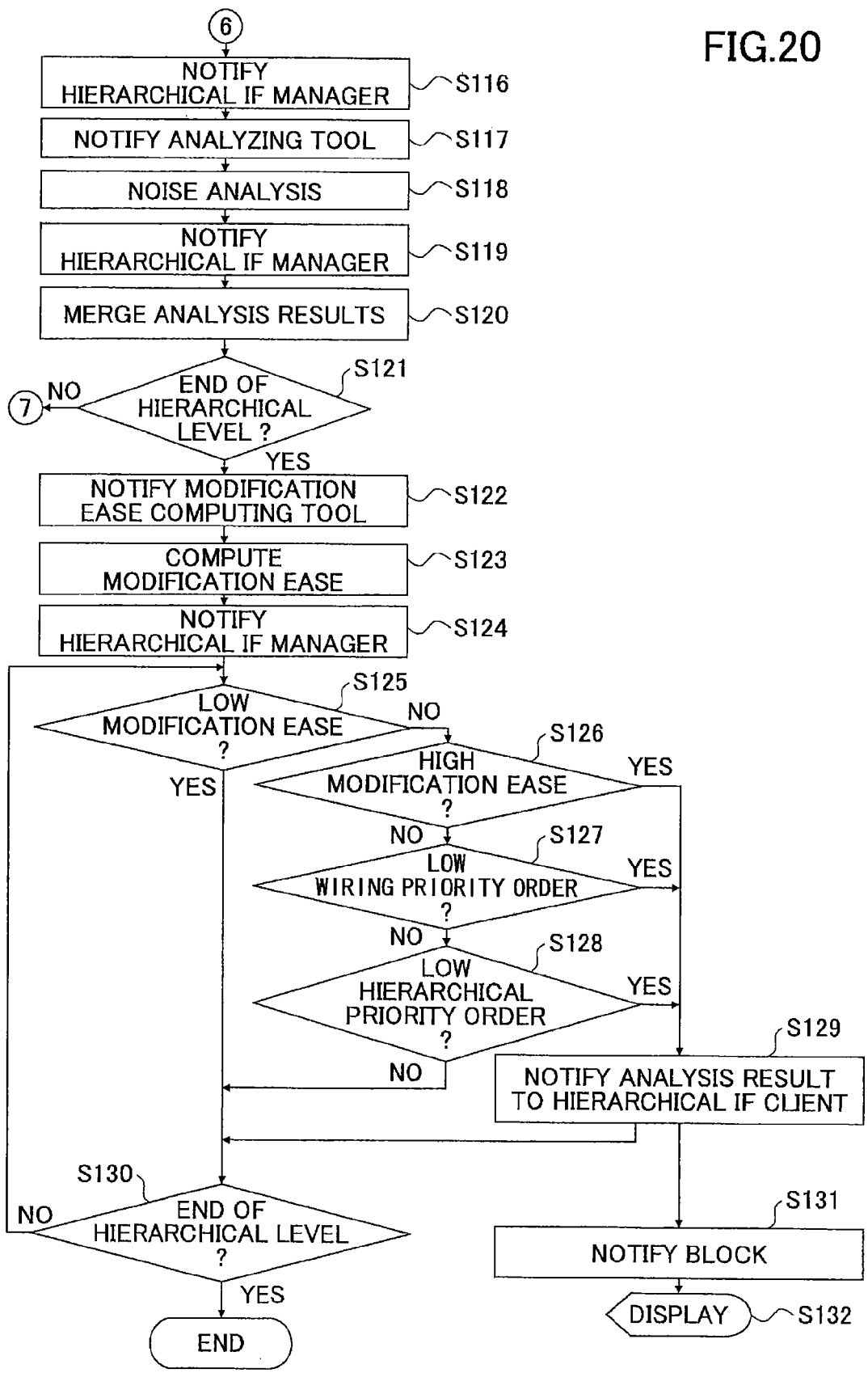

FIGS. 19 and 20 are flow charts for explaining, in more detail, the process to analyze the wiring noise.

In FIG. 19, steps S101 through S115 may be similar to the steps S31 through S45 illustrated in FIG. 9, and a description thereof will be omitted. Unlike in FIG. 9, however, in the step S103 illustrated in FIG. 19, the hierarchical IF manager 1 may request the route information of the wiring 312 to the noise analyzing tool 2-3 of the analyzing tool 2, and the steps S104 through S107 may be executed by the noise analyzing tool 2-3.

In FIG. 20, steps S116 through S132 may be similar to the steps S46 through S62 illustrated in FIG. 10, and a description thereof will be omitted. Unlike in FIG. 10, however, in the step S117 illustrated in FIG. 20, the hierarchical IF manager 1 may notify the boundary information to the noise analyzing tool 2-3, and the steps S118 and S119 may be executed by the noise analyzing tool 2-3.

Figure 21:
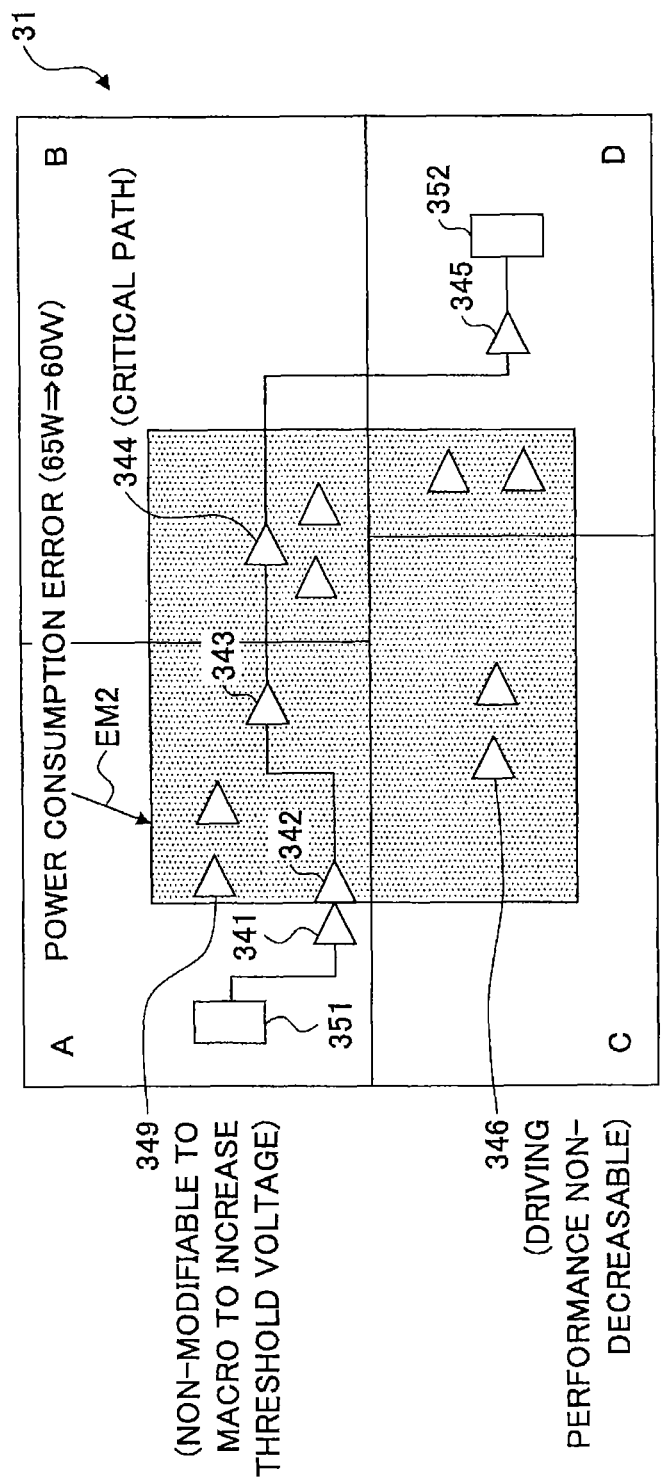
FIGS. 21 and 22 are diagrams illustrating blocks for explaining a process to analyze a power consumption error.
Figure 22:
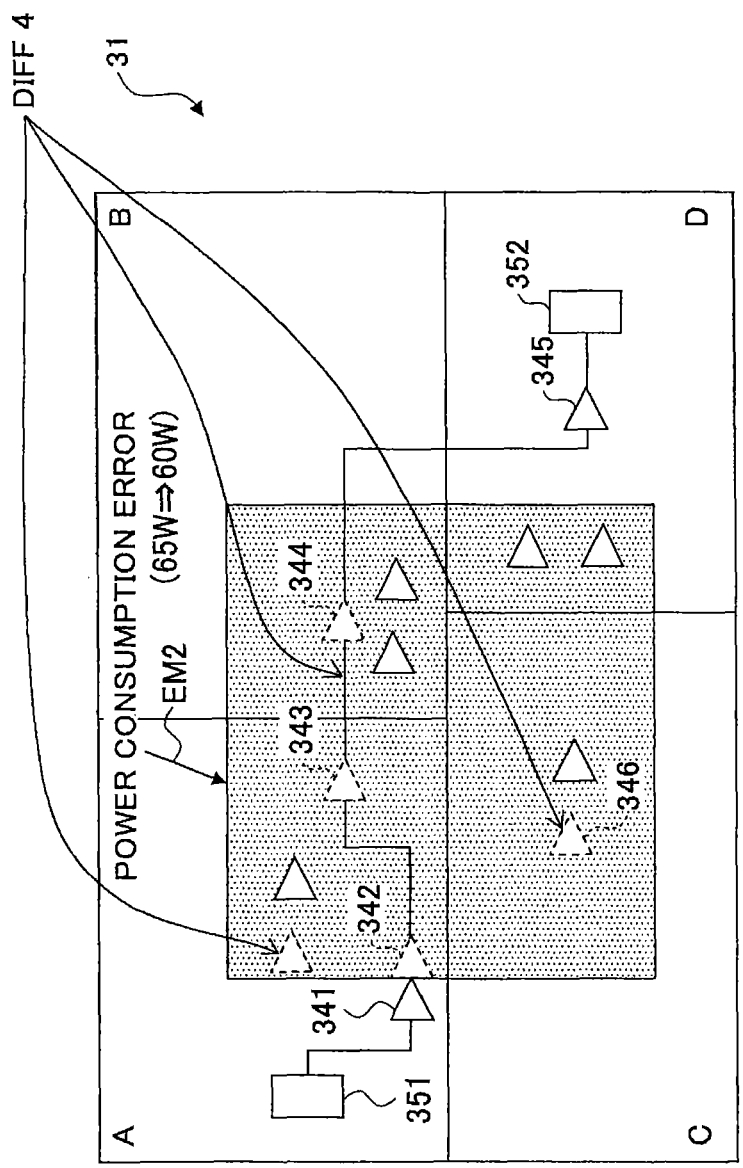
Figure 23:
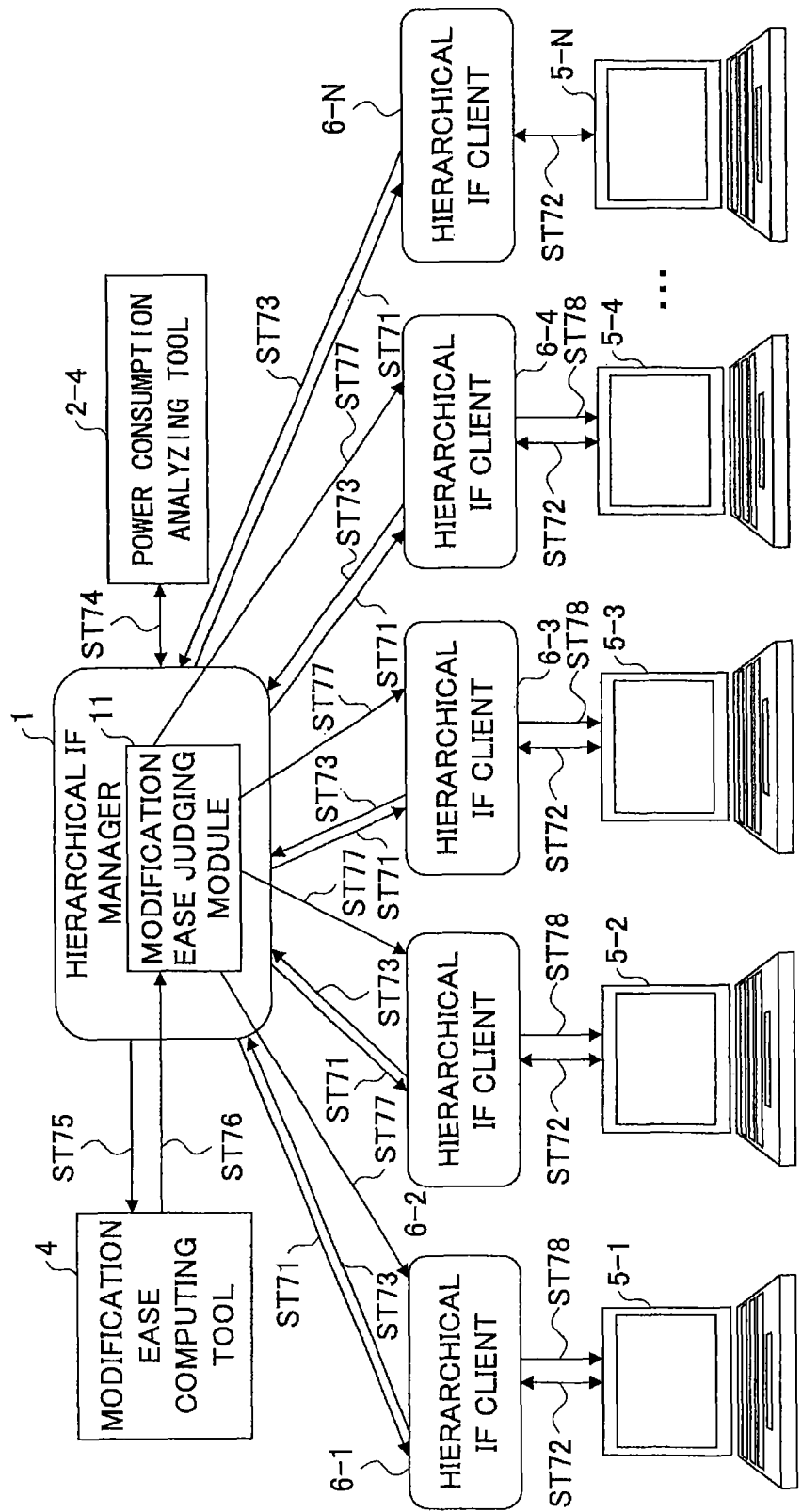
FIG. 23 is a diagram for explaining the process to analyze the power consumption error.

Next, a description will be given of a process to analyze a power consumption error, by referring to FIGS. 21 through 23. FIGS. 21 and 22 are diagrams illustrating blocks for explaining the process to analyze the power consumption error. In FIGS. 21 and 22, those parts that may be the same as those corresponding parts in FIG. 2 are designated by the same reference numerals, and a description thereof will be omitted. FIG. 23 is a diagram for explaining the process to analyze the power consumption error. In FIG. 23, those parts that may be the same as those corresponding parts in FIG. 1 are designated by the same reference numerals, and a description thereof will be omitted.

In FIGS. 21 and 22, it is assumed for the sake of convenience that three buffers 341 through 343 of the five buffers within the block A are connected to a critical path, one buffer 344 of the three buffers within the block B forms the critical path, two buffers within the block C are not connected to the critical path, and one buffer 345 of the three buffers within the block D is connected to the critical path. It is assumed that the critical path is included in a path in which the buffers 341 through 345 are connected in series, from a terminal 351 within the block A to a terminal 352 within the block D. It is also assumed that the driving performance of a buffer 346 within the block C is not decreasable, and a macro of a buffer 349 within the block A is not modifiable to a macro in which a threshold value is increased (that is, the macro is non-modifiable. In FIGS. 21 and 22, a predetermined range EM2 surrounded by a dotted line and indicated by a halftone dot pattern indicates a region in which a power consumption error is generated. FIG. 22 illustrates a result of judging the design modification ease with respect to the blocks A through D of FIG. 21.

In a step ST71 illustrated in FIG. 23, the hierarchical IF manager 1 may request the packaging information within the blocks A through D to the hierarchical IF clients 6-1 through 6-N. In a step ST72, in response to receiving the request from the hierarchical IF manager 1, the hierarchical IF clients 6-1 through 6-N may acquire the packaging information stored in the storage unit 52 of the corresponding computers 5-1 through 5-N. In a step ST73, the hierarchical IF clients 6-1 through 6-N may notify the acquired packaging information to the hierarchical IF manager 1. In a step ST74, the hierarchical IF manager 1 may merge the acquired packaging information and request a power consumption analysis of the merged result to the power consumption analyzing tool 2-4 of the analyzing tool 2, in order to receive the analysis result of the power consumption (that is, the power consumption analysis result) from the power consumption analyzing tool 2-4.

In a step ST75, the hierarchical IF manager 1 may notify the power consumption analysis result to the modification ease computing tool 4. In a step ST76, the modification ease computing tool 4 may compute the design modification ease for each of the hierarchical levels, and notify the computed results to the hierarchical IF manager 1. In a step ST77, the hierarchical IF manager 1 may judge the design modification ease of each of the hierarchical levels by the modification ease judging module 11, and notify the power consumption analysis result, including the error information, to the hierarchical IF client in the hierarchical level having a relatively high design modification ease. In this state, when the priority order of the wiring or the hierarchical level is specified, the design modification ease may be judged by taking the priority order into consideration. In this example, the hierarchical IF manager 1 may notify the power consumption analysis result to the hierarchical IF clients 6-1 through 6-4 in the step ST77. In a step ST78, the hierarchical IF clients 6-1 through 6-4 that receive the power consumption analysis result from the hierarchical IF manager 1 may notify the power consumption analysis result to the processing modules of the blocks A through D corresponding to the hierarchical IF clients 6-1 through 6-4, that is, the computers 5-1 through 5-4, and the computers 5-1 through 5-4 may display the information of the blocks A through D, including the analysis result illustrated in FIG. 22, for example, on the display units 54 thereof. In FIG. 22, a dotted line DIFF4 indicates a location where the macro is non-modifiable (that is, macro modification is not possible) or the timing is non-modifiable (that is, timing modification is not possible). The macro modification may refer to the modification of a circuit part (that is, a macro) having a specific function, and the timing modification may refer to the modification of the signal timing. In this example, the power consumption in the predetermined range EM2 between the terminals 351 and 352, indicated by the halftone dot pattern, may be decreased from 65 W to 60 W. Hence, the predetermined range EM2 in which the design modification may be achieved with ease may be judged as being a power consumption error and notified to the hierarchical level in which the design modification may be preferred.

Figure 24:
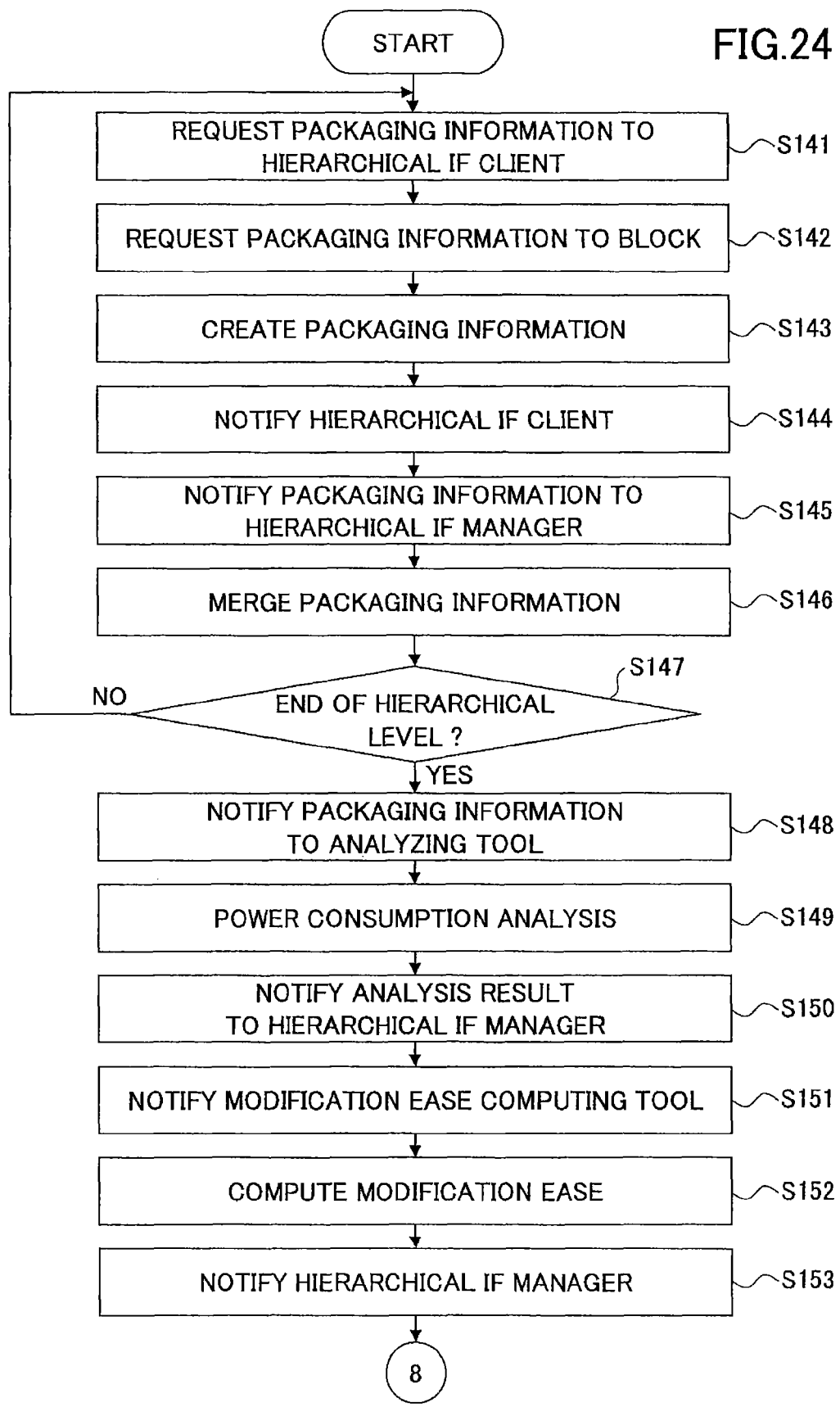
FIGS. 24 and 25 are flow charts for explaining, in more detail, the process to analyze the power consumption error.
Figure 25:
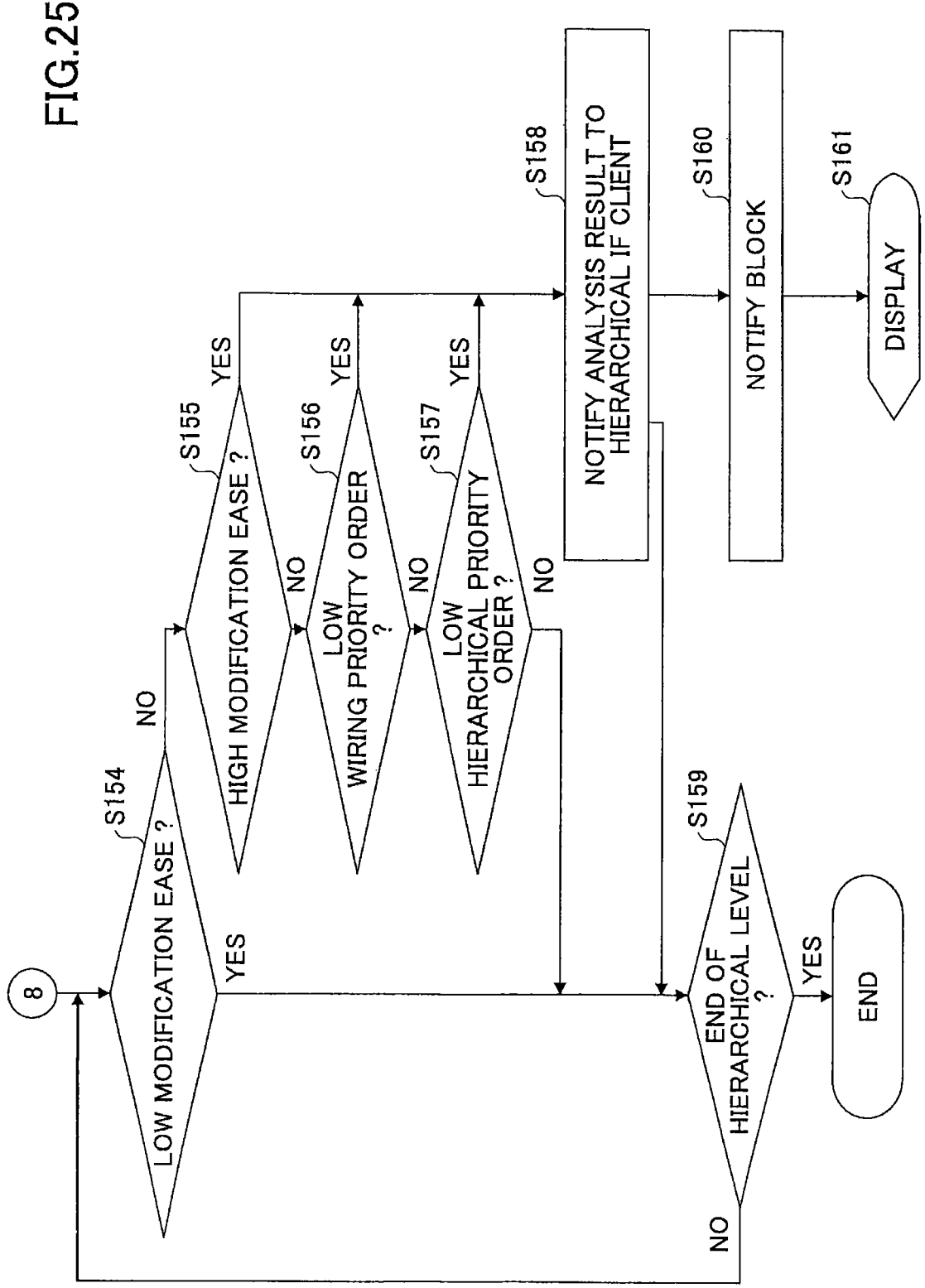

FIGS. 24 and 25 are flow charts for explaining, in more detail, the process to analyze the power consumption error.

In a step S141 illustrated in FIG. 24, the hierarchical IF manager 1 may request the packaging information within the blocks A through D to the hierarchical IF clients 6-1 through 6-N. In a step S142, in response to receiving the request from the hierarchical IF manager 1, the hierarchical IF clients 6-1 through 6-N may request the packaging information to the corresponding computers 5-1 through 5-N. Steps S143 and S144 may be executed by each of the computers 5-1 through 5-N. In the step S143, each of the computers 5-1 through 5-N may read and acquire the packaging information stored in the storage unit 52 thereof. In the step S144, each of the computers 5-1 through 5-N may notify the acquired packaging information to the corresponding hierarchical IF clients 6-1 through 6-N. In a step S145, the hierarchical IF clients 6-1 through 6-N may notify the acquired packaging information to the hierarchical IF manager 1.

Steps S146 through S148 may be executed by the hierarchical IF manager 1. In the step S146, the hierarchical IF manager 1 may merge the acquired packaging information and obtain a merged result. In the step S147, a judgement may be made to determine whether the processing of the packaging information from all of the hierarchical IF clients 6-1 through 6-N ended, and the process may return to the step S141 when the judgement result is NO. When the judgement result in the step S147 is YES, the step S148 may notify the merged result of the packaging information to the power consumption analyzing tool 2-4.

Steps S149 and S150 may be executed by the power consumption analyzing tool 2-4. In the step S149, a power consumption analysis may be performed with respect to the merged result of the packaging information. In the step S150, the power consumption analysis result may be notified to the hierarchical IF manager 1. In a step S151, the hierarchical IF manager 1 may notify the power consumption analysis result to the modification ease computing tool 4. Steps S152 and S153 may be executed by the modification ease computing tool 4. In the step S152, the design modification ease may be computed for each of the hierarchical levels. In addition, in the step S153, the computed result of the design modification ease may be notified to the hierarchical IF manager 1, and the process may advance to a step S154 illustrated in FIG. 25.

In FIG. 25, steps S154 through S160 may be similar to the steps S55 through S62 illustrated in FIG. 10, and a description thereof will be omitted. Unlike FIG. 10, however, in the step S158 illustrated in FIG. 25, the hierarchical IF manager 1 may notify the power consumption analysis result to the hierarchical IF clients 6-1 through 6-4.

Of course, amongst the tools 2-1 through 2-4 of the analyzing tool 2, an arbitrary combination of two or more tools may be used to perform an analysis that may be preferred.

In each of the embodiments described above, the blocks A through D forming the design target circuit occupy mutually different areas on the plan view (tat is, on a plane parallel to a substrate surface on which the circuit is formed). However, two or more blocks of the design target circuit may have the same occupying area, or each of the blocks of the design target circuit may have the same occupying area.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A circuit designing method to design a design target circuit by a plurality of client computers configured to design a plurality of blocks forming the design target circuit in parallel, and a server configured to exchange information in real-time with each of the plurality of client computers, said circuit designing method comprising:

first notifying, by each of the plurality of client computers to the server, information related to blocks corresponding to a request from the server, in response to the request;

analyzing each of the blocks by an analyzing tool within the server, based on the information acquired from each of the plurality of client computers, and obtaining an analysis result; and second notifying, by the server to each of the plurality of client computers, the analysis result obtained by the analyzing, wherein, when the analysis result includes an error in one of the blocks, a modification ease computing tool within the server computes a design modification ease of the one of the blocks for suppressing the error thereof, and includes the design modification ease in the analysis result notified to each of the plurality of client computers by the second notifying, and wherein the design modification ease is at least one information selected from a group of information related to a modification ease for route modification, information related to a modification ease for signal timing correction, information related to a modification ease for noise analysis correction, and information related to a modification ease for power consumption correction.

2. The circuit designing method as claimed in claim 1, further comprising:

adding, by the server, a priority order of each of the blocks, when computing the design modification ease by the modification ease computing tool, wherein the modification ease computing tool computes the design modification ease according to the priority order, with respect to the blocks for which computation results obtained by the modification ease computing tool are the same, in order to judge that a block having a higher priority order more unlikely requires a design modification.

3. The circuit designing method as claimed in claim 2, wherein the priority order includes a net priority order that specifies a priority order of a route according to a preset route type, and a hierarchical priority order that specifies a priority order according to a type of circuit part.

4. The circuit designing method as claimed in claim 1, wherein the analyzing tool analyzes the one of the blocks based on a packaging rule that includes routing rule information including at least one information selected from a group of information related to a spacing value of place and route, information related to a driving performance, information related to an input load, and information related to a wiring capacitance, and wherein the analyzing tool includes at least one tool selected from a group including a place and route inspecting tool to inspect the place and route according to contents to be analyzed, a timing analyzing tool to analyze timings of various signals, a noise analyzing tool to analyze noise, and a power consumption analyzing tool to analyze a power consumption.

5. The circuit designing method as claimed in claim 1,
wherein the modification ease computing tool adds a level indicating an extent to which a modification is possible with respect to present packaging data related to the one of the blocks, based on at least one information selected from the group of information wherein the modification ease for the route modification includes at least one of route information and route congestion, the route information including information related to a wiring layer, wiring length, and wiring coordinates, the route congestion including information related to neighboring wirings, and congestion rate of wirings, wherein the modification ease for the signal timing correction includes at least one of information related to a driving performance of a transistor gate that is used, and information indicating an extent to which shortening or extending of the signal timing is possible, wherein the modification ease for the noise analysis correction includes at least one of the route information and the route congestion, and wherein the modification ease for the power consumption correction includes at least one information selected from a group including information related to a threshold voltage of a macro to be used, the information related to the driving performance of the transistor gate to be used, and information indicating whether the signal timing modification is possible.

6. A circuit designing system comprising:
a plurality of client computers configured to design a plurality of blocks forming a design target circuit in parallel; and
a server configured to exchange information with each of the plurality of client computers in real-time,
wherein each of the plurality of client computers includes a first notifying module configured to notify, in response to a request from the server, information related to blocks corresponding to the request, and
wherein the server includes
an analyzing module configured to analyze each of the blocks by an analyzing tool within the server, based on the information acquired from each of the plurality of client computers, and obtain an analysis result;
a second notifying module configured to notify the analysis result obtained by the analyzing module to each of the plurality of client computers; and
a modification ease computing tool configured to compute, when the analysis result includes an error in one of the blocks, a design modification ease of the one of the blocks for suppressing the error thereof, and to include the design modification ease in the analysis result notified to each of the plurality of client computers by the second notifying module,
wherein the design modification ease is at least one information selected from a group of information related to a modification ease for route modification, information related to a modification ease for signal timing correction, information related to a modification ease for noise analysis correction, and information related to a modification ease for power consumption correction.

7. The circuit designing system as claimed in claim 6, wherein the server further includes a module configured to add a priority order of each of the blocks, when computing the design modification ease by the modification ease computing tool,
wherein the modification ease computing tool computes the design modification ease according to the priority order, with respect to the blocks for which computation results obtained by the modification ease computing tool are the same, in order to judge that a block having a higher priority order more unlikely requires a design modification.

8. The circuit designing system as claimed in claim 7, wherein the priority order includes a net priority order that specifies a priority order of a route according to a preset route type, and a hierarchical priority order that specifies a priority order according to a type of circuit part.

9. The circuit designing system as claimed in claim 6,
wherein the analyzing tool analyzes the one of the blocks based on a packaging rule that includes routing rule information including at least one information selected from a group of information related to a spacing value of place and route, information related to a driving performance, information related to an input load, and information related to a wiring capacitance, and
wherein the analyzing tool includes at least one tool selected from a group including a place and route inspecting tool to inspect the place and route according to contents to be analyzed, a timing analyzing tool to analyze timings of various signals, a noise analyzing tool to analyze noise, and a power consumption analyzing tool to analyze a power consumption.

10. The circuit designing system as claimed in claim 6,
wherein the modification ease computing tool adds a level indicating an extent to which a modification is possible with respect to present packaging data related to the one of the blocks, based on at least one information selected from the group of information
wherein the modification ease for the route modification includes at least one of route information and route congestion, the route information including information related to a wiring layer, wiring length, and wiring coordinates, the route congestion including information related to neighboring wirings, and congestion rate of wirings,
wherein the modification ease for the signal timing correction includes at least one of information related to a driving performance of a transistor gate that is used, and information indicating an extent to which shortening or extending of the signal timing is possible,
wherein the modification ease for the noise analysis correction includes at least one of the route information and the route congestion, and
wherein the modification ease for the power consumption correction includes at least one information selected from a group including information related to a threshold voltage of a macro to be used, the information related to the driving performance of the transistor gate to be used, and information indicating whether the signal timing modification is possible.

11. A non-transitory computer-readable storage medium having stored therein a program for causing a server computer to execute a circuit design management process, the circuit design management process comprising:

exchanging information in real-time with each of a plurality of client computers configured to design a plurality of blocks forming a design target circuit in parallel;

receiving, from each of the plurality of client computers, information related to blocks corresponding to a request sent from the server computer to each of the plurality of client computers;

analyzing each of the blocks by an analyzing tool based on the information received from each of the plurality of client computers, and obtaining an analysis result;

notifying the analysis result obtained by the analyzing to each of the plurality of client computers; and when the analysis result includes an error in one of the blocks, computing, by a modification ease computing tool, a design modification ease of the one of the blocks for suppressing the error thereof, and including the design modification ease in the analysis result notified to each of the plurality of client computers by the notifying, wherein the design modification ease is at least one information selected from a group of information related to a modification ease for route modification, information related to a modification ease for signal timing correction, information related to a modification ease for noise analysis correction, and information related to a modification ease for power consumption correction.

12. The non-transitory computer-readable storage medium as claimed in claim 11, wherein the circuit design management process further comprises:

adding a priority order of each of the blocks, when computing the design modification ease by the modification ease computing tool, wherein the modification ease computing tool computes the design modification ease according to the priority order, with respect to the blocks for which computation results obtained by the modification ease computing tool are the same, in order to judge that a block having a higher priority order more unlikely requires a design modification.

13. The non-transitory computer-readable storage medium as claimed in claim 12, wherein the priority order includes a net priority order that specifies a priority order of a route according to a preset route type, and a hierarchical priority order that specifies a priority order according to a type of circuit part.

14. The non-transitory computer-readable storage medium as claimed in claim 11, wherein the analyzing tool analyzes the one of the blocks based on a packaging rule that includes routing rule information including at least one information selected from a group of information related to a spacing value of place and route, information related to a driving performance, information related to an input load, and information related to a wiring capacitance, and wherein the analyzing tool includes at least one tool selected from a group including a place and route inspecting tool to inspect the place and route according to contents to be analyzed, a timing analyzing tool to analyze timings of various signals, a noise analyzing tool to analyze noise, and a power consumption analyzing tool to analyze a power consumption.

15. The non-transitory computer-readable storage medium as claimed in claim 11, wherein the modification ease computing tool adds a level indicating an extent to which a modification is possible with respect to present packaging data related to the one of the blocks, based on at least one information selected from the group of information, wherein the modification ease for the route modification includes at least one of route information and route congestion, the route information including information related to a wiring layer, wiring length, and wiring coordinates, the route congestion including information related to neighboring wirings, and congestion rate of wirings, wherein the modification ease for the signal timing correction includes at least one of information related to a driving performance of a transistor gate that is used, and information indicating an extent to which shortening or extending of the signal timing is possible, wherein the modification ease for the noise analysis correction includes at least one of the route information and the route congestion, and wherein the modification ease for the power consumption correction includes at least one information selected from a group including information related to a threshold voltage of a macro to be used, the information related to the driving performance of the transistor gate to be used, and information indicating whether the signal timing modification is possible.

* * * * *